US012752300B2

(12) United States Patent
Pokroy et al.

(10) Patent No.: US 12,752,300 B2
(45) Date of Patent: Oct. 6, 2026

(54) PREPARATION OF HYDROPHOBIC SURFACES

(71) Applicant: Technion Research & Development Foundation Limited, Haifa (IL)

(72) Inventors: Boaz Pokroy, Haifa (IL); Iryna Polishchuk, Haifa (IL); Elena Prudnikov, Haifa (IL); Ester Segal, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 18/412,672

(22) Filed: Jan. 15, 2024

(65) Prior Publication Data

US 2024/0149298 A1 May 9, 2024

Related U.S. Application Data

(63) Continuation of application No. PCT/IL2022/050766, filed on Jul. 15, 2022.

(Continued)

(51) Int. Cl.
*B05D 5/08* (2006.01)
*A23P 20/10* (2016.01)

(Continued)

(52) U.S. Cl.
CPC ................ *B05D 5/08* (2013.01); *A23P 20/11* (2016.08); *B05D 1/02* (2013.01); *C09D 5/14* (2013.01); *C09D 7/20* (2018.01); *C09D 7/63* (2018.01); *D06M 13/188* (2013.01); *B05D 2201/02* (2013.01); *B05D 2202/15* (2013.01); *B05D 2203/20* (2013.01); *B05D 2203/22* (2013.01); *B05D 2203/35* (2013.01); *D06M 2200/12* (2013.01)

(58) Field of Classification Search
None
See application file for complete search history.

(56) References Cited

U.S. PATENT DOCUMENTS 4,915,971 A * 4/1990 Fennema ............... A21D 13/41 426/94
2015/0231599 A1 * 8/2015 Dutkiewicz ............ D06M 11/57 502/401
2015/0232690 A1 * 8/2015 Armstrong ............... C09D 4/06 523/455

FOREIGN PATENT DOCUMENTS

CN 108948837 12/2018
WO WO 2014/091489 6/2014

OTHER PUBLICATIONS

Lee et al.; Spray Coating of Hydrophobic Iron Fatty Acids/PS Composite Solutions for the Preparation of Superhydrophobic Paper; Korean Chemical Society; 37.11; pp. 1862-1865; 2016.*

(Continued)

*Primary Examiner* — Michael P. Rodriguez

(57) ABSTRACT

A process of depositing a hydrophobic or superhydrophobic film on a surface of a substrate, effected by spraying onto the substrate's surface a solution comprising a fatty acid and an organic solvent, is provided. Substrates and articles-of-manufacturing containing the substrates, having a hydrophobic or superhydrophobic coating/film deposited thereon, obtainable or prepared by the process, are also provided. The process is usable for reducing a load of a pathogenic microorganism and/or for preventing biofilm formation on and/or in the substrates or articles-of-manufacturing containing same.

12 Claims, 18 Drawing Sheets

Related U.S. Application Data

Figure 1A:
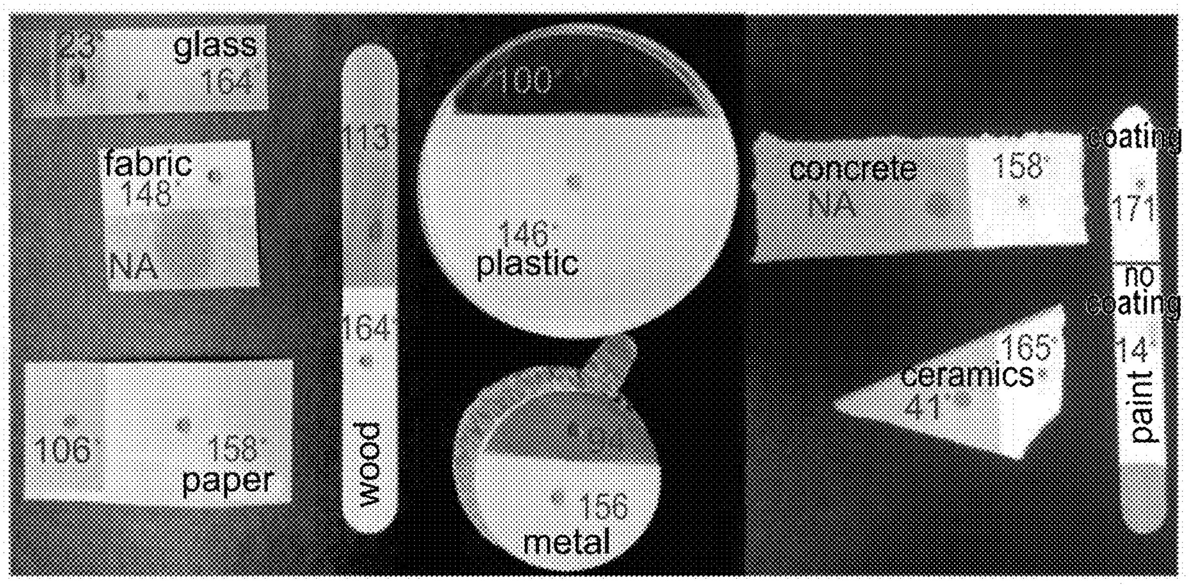

(60) Provisional application No. 63/222,025, filed on Jul. 15, 2021.

(51) Int. Cl.

| | |
|---|---|
| ***B05D 1/02*** | (2006.01) |
| ***C09D 5/14*** | (2006.01) |
| ***C09D 7/20*** | (2018.01) |
| ***C09D 7/63*** | (2018.01) |
| ***D06M 13/188*** | (2006.01) |

(56) References Cited

OTHER PUBLICATIONS

Daneshmand et al.; Deposition of Superhydrophobic Fatty Acid-Coated Al203 Films by Spray Pyrolysis Method: Effect of Dispersion Mediums on Morphology and Roughness of the Layer; Protection of Metals and Physical Chemistry of Surfaces; 57; pp. 335-343; 2020.*

Supplementary European Search Report and the European Search Opinion Dated Apr. 10, 2025 From the European Patent Office Re. Application No. 22841623.6. (8 Pages).

International Search Report and the Written Opinion Dated Oct. 26, 2022 From the International Searching Authority Re. Application No. PCT/IL2022/050766. (16 Pages).

Churchward et al. "Alternative Antimicrobials: The Properties of Fatty Acids and Monoglycerides", Critical Reviews in Microbiology, 44(5): 561-570, Published Online May 7, 2018.

Daneshmand et al. "Deposition of Superhydrophobic Fatty Acid-Coated Al203 Films by Spay Pyrolysis Method: Effect of Dispersion Mediums on Morphology and Roughness of the Layer", Protection of Metals and Physical Chemistry of Surfaces, 57(2): 335-343, May 15, 2021.

Desbois et al. "Antibacterial Free Fatty Acids: Activities, Mechanisms of Action and Biotechnological Potential", Applied Microbiology and Biotechnology, 85(6): 1629-1642, Published Online Dec. 3, 2009.

Irzh et al. "Rapid Deposition of Transparent Super-Hydrophobic Layers on Various Surfaces Using Microwave Plasma", ACS Applied Materials & Interfaces, 3(12): 4566-4572, Published Online Nov. 14, 2011.

Lee et al. "Spray Coating of Hydrophobic Iron Fatty Acids/PS Composite Solutions for the Preparation of Superhydrophobic Paper", Bulletin of the Korean Chemical Society, 37(11): 1862-1865, Published Online Oct. 4, 2016.

Lin et al. "Innovations in the Development and Application of Edible Coatings for Fresh and Minimally Processed Fruits and Vegetables", Comprehensive Reviews in Food Science and Food Safety, 6(3): 60-75, Jun. 16, 2007.

Pechook et al. "Bioinspired Passive Anti-Biofouling Surfaces Preventing Biofilm Formation", Journal of Materials Chemistry B, 3(7): 1371-1378, Published Online Jan. 14, 2015.

Prudnikov et al. "Self-Assembled Fatty Acid Crystalline Coatings Display Non-Toxic Superhydrophobic Antimicrobial Properties", ArXiv Preprint ArXiv:2208.08895v1, 41 P., Aug. 10, 2022.

Vargas et al. "Development of Edible Coatings for Fresh Fruits and Vegetables: Possibilities and Limitations", Fresh Produce, 2(2), 32-40, 2008.

* cited by examiner

Uncoated glass

*Listeria innocua*

Palmitic acid

*Listeria innocua*

Steric acid

*Listeria innocua*

Arachidic acid

*Listeria innocua*

Uncoated Palmitic Stearic Archidic acid

Uncoated Palmitic Stearic Archidic acid

Uncoated Palmitic Stearic Archidic acid

PREPARATION OF HYDROPHOBIC SURFACES

RELATED APPLICATIONS

This application is a Continuation of PCT Patent Application No. PCT/IL2022/050766 having International filing date of Jul. 15, 2022, which claims the benefit of priority of under 35 USC § 119(e) of U.S. Provisional Patent Application No. 63/222,025 filed on Jul. 15, 2021. The contents of the above applications are all incorporated by reference as if fully set forth herein in their entirety.

FIELD AND BACKGROUND OF THE INVENTION

The present invention, in some embodiments thereof, relates to material science and, more particularly, but not exclusively, to a process of depositing a hydrophobic or superhydrophobic layer on a substrate's surface, and to substrates featuring a hydrophobic or superhydrophobic surface and articles containing such substrates, obtainable thereby. The process is usable for reducing a load of a pathogenic microorganism and/or for preventing biofilm formation on and/or in the substrates and articles-of-manufacturing.

Surface bacterial contamination is a widespread phenomenon and can potentially occur in all levels of social, business and industry sectors including food manufacturing and packaging, pharmaceutical and cosmetic industry, households, offices, hospitals, public places, supermarkets, etc. Effective prevention of bacterial contamination as well as decontamination of surfaces is a major and significant challenge in all these fields and others.

Superhydrophobicity is a physical property of a surface whereby the surface is extremely resistant to wetting by water, typically displaying water contact angles (W.C.A) higher than 140°, and low contact angle hysteresis.

Superhydrophobic traits have been attributed, for example, to leaves of plants, insect wings, or the wings of birds, resulting in the ability to remove any external contaminants without requiring any specific removal process (a property also known as self-cleaning) and/or to prevent contamination in the first place. In many cases, the superhydrophobicity characteristic enables plants to reduce water loss, and reduce the adhesion of pathogens. Furthermore, it has been shown that the natural waxes, which are located on the surface of the cuticle, can exhibit several different morphological forms such as platelets, tubules, rodlets, threads, and others. These epicuticular waxes have a hierarchical roughness which, combined with their intrinsic hydrophobic characteristics, results in superhydrophobic qualities that exist on the leaves' surface. In this respect, the lotus leaf has become an icon for superhydrophobicity due to the unique surface chemistry originated from epidermal cells of waxy hydrophobic crystals. It has been found that the lotus leaf surface is covered with micrometer-sized papillae decorated with nanometer branchlike protrusions. Apart from this unique hierarchical morphology, the roughness of the hydrophobic convex cell papillae reduces the contact area between the surface and a liquid drop, with droplets residing only on the tips of the epicuticular wax crystals on the top of papillose epidermal cells. That is, the water repellency stems from the synergy of dual-length-scale roughness and hydrophobic surface chemistry.

Thus, it has been recognized that in order to achieve a superhydrophobic surface, two factors have to be fulfilled;

one is a geometric factor, according to which increasing the surface roughness causes an increase in the hydrophobicity of the surface because air can be trapped in the fine structures and thus reduces the contact area between the liquid and the surface; and the other is surface chemistry, according to which the more hydrophobic are the chemical moieties on the surface, the more superhydrophobic is the surface.

Based on the understandings of natural superhydrophobic surfaces several techniques and methodologies have been studied, for constructing artificial advanced materials. Such a "bioinspired approach" of designing novel materials involves the transformation of the ideas, concepts, and underlying principles developed by nature into manmade technology.

A variety of methods have been developed to produce hydrophobic surfaces with nanoscale roughness, so as to achieve superhydrophobicity. These methods include, for example, the fabrication of polymer nanofibers and densely packed aligned carbon nanotube films combined with fluoroalkylsilane coating, solidification of melted alkylketene dimmer, anodic oxidation of aluminum with fluoroalkyltrimethoxysilane, immersion of porous alumina gel films in boiling water, mixing of a sublimation material with silica particles, and treating the fluorinated polymer film with different plasma techniques [Irzh et al. 2011, *ACS Appl. Mater. Interfaces*. 3, 4566].

While superhydrophobic surfaces in natural systems repel pathogens, bio-inspired superhydrophobic surfaces may exhibit anti-microbial activity.

Several methodologies have been described for providing surfaces with anti-microbial or anti-fouling properties. Examples are surfaces modified with nanoparticles (ZnO, $TiO_2$ and carbon nanotubes) that mechanically damage bacterial cells. However, most fabrication methods rely on one of the following strategies: a release of biocidal compounds such as silver or copper ions, various antibiotics, chlorohexidine, or quaternary ammonium salts; and inhibition of adhesion. Both these strategies, however, have drawbacks; Biocidal-releasing compounds usually have only short-term efficiency because of the limited amount of the biocidal compound or an acquired resistance to the compound. Metallic nanoparticles might have harmful effects on human tissue. Mechanical decomposition of the coating may be dangerous to human body because of the harmful chemical properties of the coating.

Currently, however, the main strategy for preventing microbial contamination on the surfaces still relies on regular and aggressive cleaning and disinfection rather than eliminating bacterial attachment. Importantly, coatings available on the market are not defined as edible or food-friendly and therefore could not be used in applications where the edibility and non-toxicity can be a huge benefit.

WO 2014/091489 teaches substrates coated with hydrocarbon or fluorinated wax, applied via thermal evaporation, spray coating or dip coating, and their use in preventing biofilm formation.

Fatty acids and derivatives thereof, for example, fatty acid esters and glycerides, have been used in combination with other substances, such as lipids, polysaccharides, proteins, natural waxes and resins, salts etc., for forming edible coatings on substrates. Exemplary reviews include Vargas et al., Fresh Produce 2 (2), 32-40, 2008; and Lin and Zhao, Comprehensive Reviews in Food Science and Food Safety, Vol. 6, page 60, 2007.

Additional background art includes Churchward et al., 2018, 44, 5, 561-570.

SUMMARY OF THE INVENTION

There is an unmet need for the effective prevention of microbial contamination as well as decontamination of surfaces using non-aggressive cleaning and disinfection agents.

The present inventors have envisioned and successfully practiced the deposition of non-toxic fatty acid-based layers which can be applied on a variety of substrates, and provide hydrophobic or superhydrophobic behavior as well as anti-microbial activity to the surface of the substrate.

According to an aspect of some embodiments of the present invention there is provided a process of depositing a hydrophobic or superhydrophobic layer on at least a portion of a surface of a substrate, the process comprising spraying onto the at least a portion of the surface a solution comprising a fatty acid and an organic solvent, thereby depositing a hydrophobic or superhydrophobic layer on the at least a portion of the surface.

According to some of any of the embodiments described herein, the fatty acid is a saturated fatty acid.

According to some of any of the embodiments described herein, the fatty acid is of at least 12 carbon atoms in length.

According to some of any of the embodiments described herein, the fatty acid is of at least 16, or of at least 18, carbon atoms in length.

According to some of any of the embodiments described herein, the organic solvent has a boiling temperature lower than 70° C., or lower than 60° C.

According to some of any of the embodiments described herein, the organic solvent has a boiling temperature lower than 50° C.

According to some of any of the embodiments described herein, the organic solvent has an evaporation rate higher than 1, or higher than 2, or higher than 3, relative to n-butyl acetate.

According to some of any of the embodiments described herein, the organic solvent has an evaporation rate higher than 5, relative to n-butyl acetate.

According to some of any of the embodiments described herein, a concentration of the fatty acid in the solution ranges from 1 to 100 mg/ml, or from 10 to 100 mg/ml, or from 5 to 50 mg/ml.

According to some of any of the embodiments described herein, the fatty acid is at least 18 carbon atoms in length, the organic solvent has an evaporation rate higher than 5 relative to n-butyl acetate, and a concentration of the fatty acid is the solution ranges from 5 to 50 mg/ml.

According to some of any of the embodiments described herein, the solution further comprises an anti-microbial agent.

In some of any of the embodiments described herein, the anti-microbial agent is an additional fatty acid.

In some of any of the embodiments described herein, the additional fatty acid is of no more than 12, or no more than 10, carbon atoms in length.

In some of any of the embodiments described herein, the additional fatty acid is liquid at room temperature.

According to some of any of the embodiments described herein, the solution further comprises a coloring agent.

In some of any of the embodiments described herein, the coloring agent is an edible coloring agent.

According to some of any of the embodiments described herein, the at least a portion of the surface that has the layer deposited thereon features a static contact angle with water of at least 90°, or at least 100°.

According to some of any of the embodiments described herein, the at least a portion of the surface that has the layer deposited thereon features a static contact angle with water of at least 1400.

According to some of any of the embodiments described herein, the at least a portion of the surface that has the layer deposited thereon features roughness of at least 0.2, or at least 1, or at least 2, or at least 3, micrometer(s).

According to some of any of the embodiments described herein, the at least a portion of the surface that has the layer deposited thereon features roughness of from 1 to 50, micrometer(s).

According to some of any of the embodiments described herein, the at least a portion of the surface that has the layer deposited thereon features roughness of from 3 to 30, micrometer(s).

According to some of any of the embodiments described herein, the deposited layer features a porosity that ranges from 10 to 85% by volume, or from 40 to 85%, by volume.

According to some of any of the embodiments described herein, the spraying is performed at room temperature.

According to some of any of the embodiments described herein, the spraying is performed using a spray gun.

According to some of these embodiments, spraying using a spray gun in performed using the following parameters:

a diameter of the nozzle orifice ranges from about 1.4 to about 2.0 mm; and/or the spraying is performed at an air/propellant pressure that ranges from about 4 to about 6 bars; and/or the spraying is performed at a spray distance of from about 5 to about 30 cm, or from about 10 to about 20 cm; and/or a pulse duration of the spraying ranges from about 0.5 to about 10, or from 1 to 5 seconds.

According to some of any of the embodiments described herein, the process further comprises, subsequent to the spraying, heating the substrate.

According to some of any of the embodiments described herein, the substrate comprises a material selected from a polymeric material, a plastic material, glass, wood, concrete, paper, a metallic material, a fiber, a ceramic material, a semi-conducting material, a natural organic material and any combination thereof.

In some of any of the embodiments described herein, the natural organic material is selected from a food product and an agricultural substance.

According to some of any of the embodiments described herein, the substrate is or forms a part of an article-of-manufacturing.

In some of any of the embodiments described herein, the article-of-manufacturing is selected from a medical device, an electronic device, a component of an air-condition system or device, a food packaging material, a cosmetic packaging material, an agricultural substrate packaging material, storage containers, a vehicle component, a component of a cooling system or device, a device or system in a public store or institution, and a device or system or component of a public transportation vehicle or station.

According to some of any of the embodiments described herein, the substrate is or forms a part of an edible substance or of a food contact substance (FCS).

According to some of any of the embodiments described herein, the substrate is or forms a part of an agricultural substrate or an agricultural substance.

According to some of any of the embodiments described herein, the process is for reducing, inhibiting or preventing formation of a biofilm on the substrate or in/on an article-of-manufacturing comprising the substrate.

According to some of any of the embodiments described herein, the process is for reducing a load of a pathogenic organism on the substrate or in/on an article-of-manufacturing comprising the substrate.

According to some of any of the embodiments described herein, a substrate having deposited on at least a portion of a surface thereof a hydrophobic or superhydrophobic layer, is prepared by the process as described in any of the embodiments herein.

According to an aspect of some embodiments of the present invention, there is provided a substrate or a composition-of-matter having a fatty acid-containing composition deposited on at least a portion of a surface thereof, the at least a portion of the surface featuring at least one of: a static contact angle with water of at least 140°; a contact angle hysteresis of up to 10°; and a roughness of at least 0.2, or of at least 1 or of at least 2, micrometer.

According to some of any of the embodiments described herein, the fatty acid is a saturated fatty acid.

According to some of any of the embodiments described herein, the fatty acid is of at least 12 carbon atoms in length.

According to some of any of the embodiments described herein, the fatty acid is of at least 16, or of at least 18, carbon atoms in length.

According to some of any of the embodiments described herein, the fatty acid-containing composition further comprises an anti-microbial agent.

According to some of any of the embodiments described herein, the anti-microbial agent comprises an additional fatty acid.

According to some of any of the embodiments described herein, the additional fatty acid is of up to 12, or of up to 10, carbon atoms in length.

According to some of any of the embodiments described herein, the additional fatty acid is an unsaturated fatty acid.

According to some of any of the embodiments described herein, the additional fatty acid is liquid at room temperature.

According to some of any of the embodiments described herein, the substrate or a composition-of-matter comprises a material selected from a polymeric material, a plastic material, glass, wood, concrete, paper, a metallic material, a fiber, a ceramic material, a semi-conducting material, a natural organic material and any combination thereof.

According to some of any of the embodiments described herein, the natural organic material is selected from a food product and agricultural substance.

According to some of any of the embodiments described herein, the substrate is or forms a part of an article-of-manufacturing. According to some of these embodiments, the substrate is selected from a medical device, an electronic device, a component of an air-condition system or device, a food packaging material, a cosmetic packaging material, an agricultural substrate packaging material, storage containers, a vehicle component, a component of a cooling system or device, a device or system in a public store or institution, and a device or system or component of a public transportation vehicle or station.

According to some of any of the embodiments described herein, the substrate is an edible substance or a food contact substance.

According to some of any of the embodiments described herein, the substrate is an agricultural substrate or an agricultural substance.

According to an aspect of some embodiments of the present invention, there is provided a kit comprising a container, a fatty acid and an organic solvent, and means for spraying a solution of the fatty and the organic solvent from the container, wherein the fatty acid and the organic solvent, and the spraying, are as described in any of the respective embodiments and any combination thereof. According to some embodiments of this aspect of the present invention, the kit is for, or is identified for, depositing a hydrophobic or superhydrophobic film on a surface of a substrate and/or for reducing a load of a pathogenic microorganism on and/or in the substrate and/or for reducing, inhibiting or preventing a formation of a biofilm on the substrate or in/on an article-of-manufacturing comprising the substrate.

According to some of any of the embodiments described herein, the kit further comprises an anti-microbial agent.

In some of any of the embodiments described herein, the anti-microbial agent is an additional fatty acid as described herein in any of the respective embodiments and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1B:
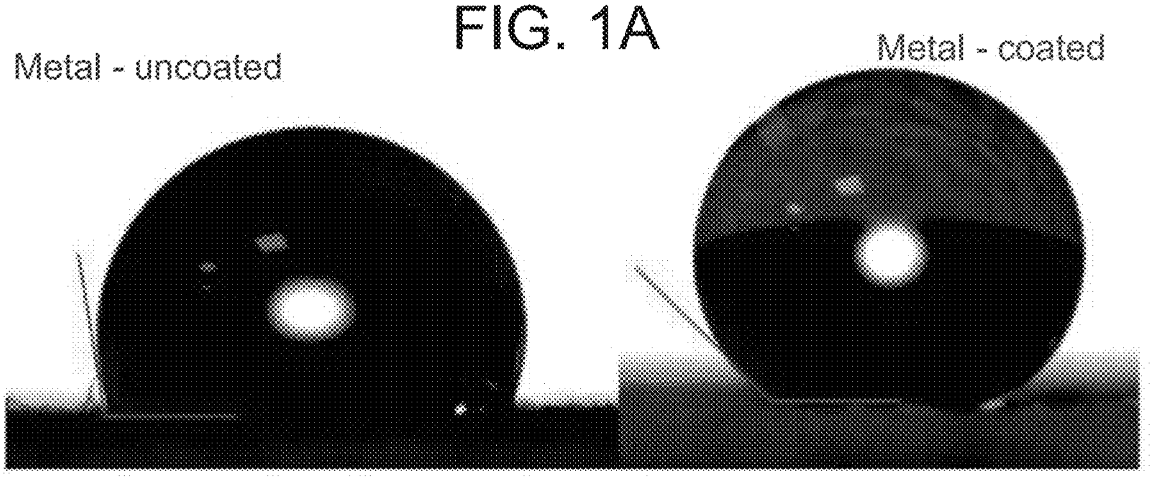
Figure 1C:
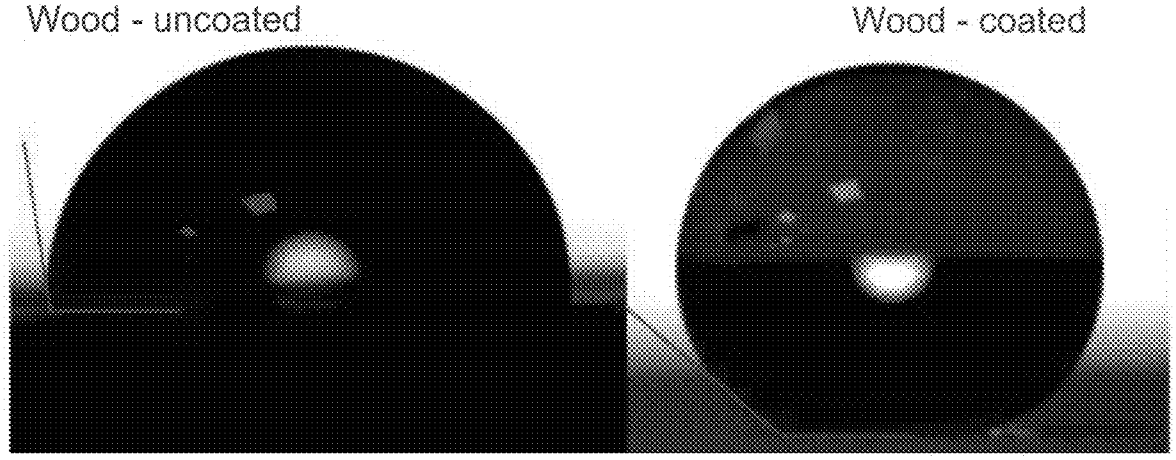

In the drawings:

FIGS. 1A-C present images of various types of substrates spray-coated with a stearic acid-based solution (coating appears in white color). To visually demonstrate the improved non-wetting properties of the coated surfaces as compared to those of non-coated a 7 microliter (μL) methyl orange water droplet is deposited on both coated and non-coated parts of each type of substrate (values of the measured contact angle before and after coating are given in blue and red color, respectively) (FIG. 1A). A water droplet deposited on a metal surface (FIG. 1B) and on a wood surface (FIG. 1C) before and after coating is also demonstrated.

Figure 2:
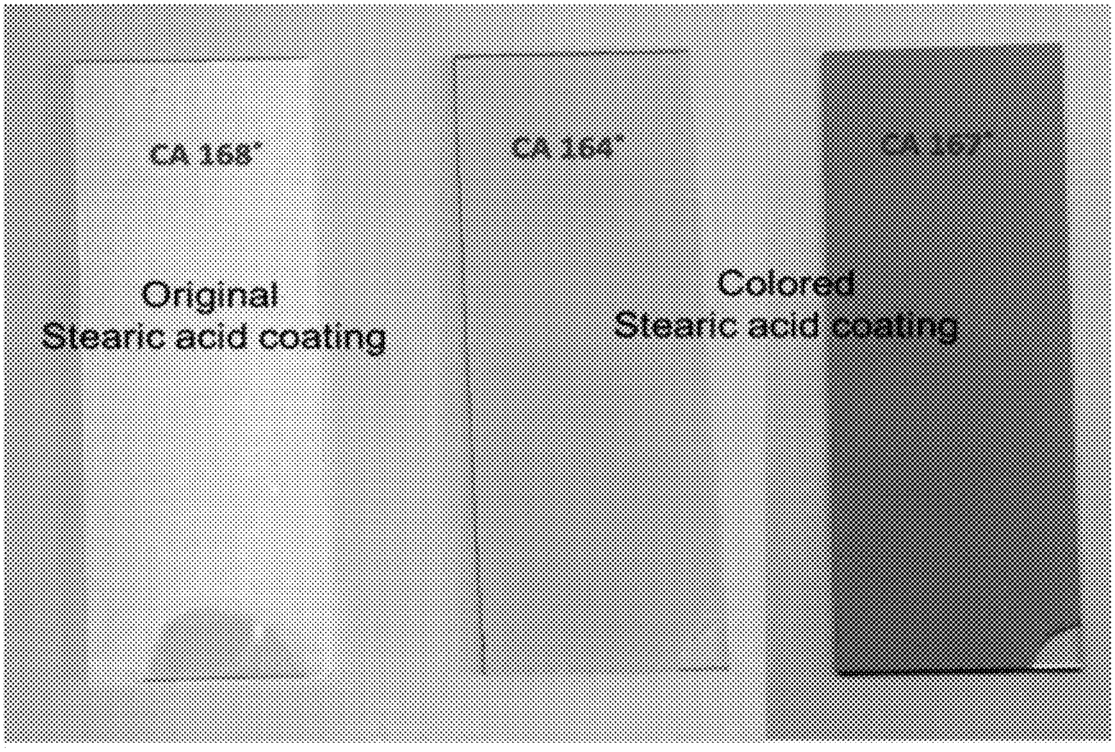

FIG. 2 presents photographs of glass substrates spray-coated with stearic acid-containing solutions according to some embodiments of the present invention, with and without a coloring agent.

Figure 3A:
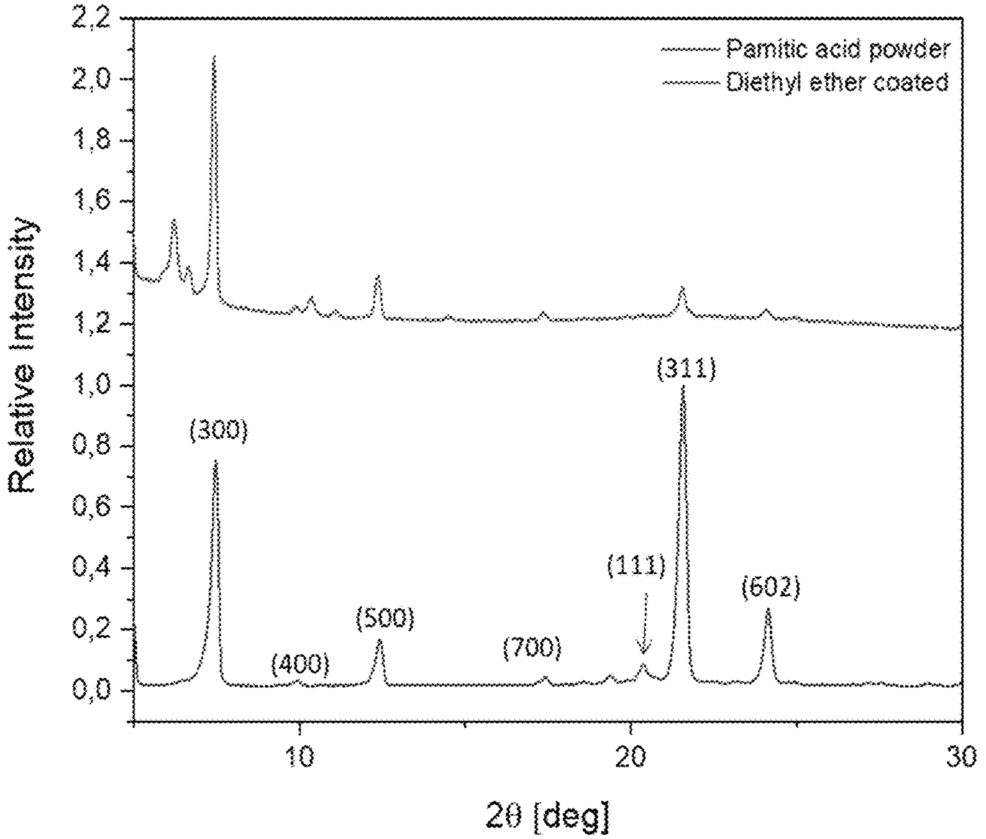
Figure 3B:
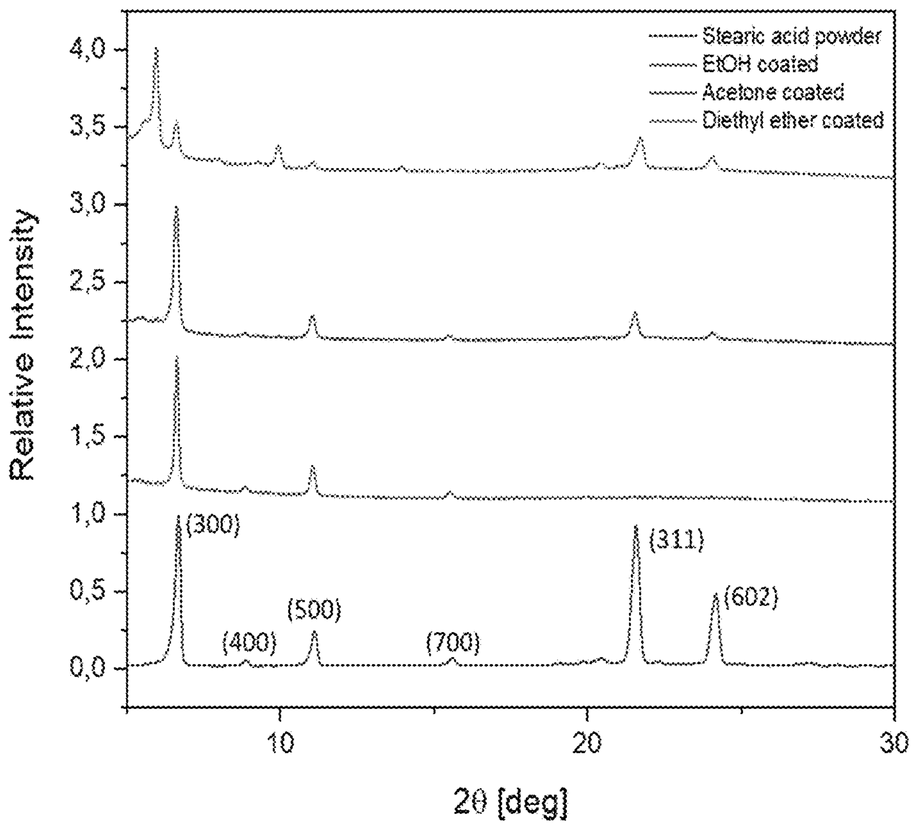

FIGS. 3A-B present experimental X-ray diffractions of grinded (powdery) fatty acids and fatty acids coatings obtained by spraying a solution of the indicated fatty acid in an indicated organic solvent. FIG. 3A presents data obtained for palmitic acid powder and palmitic acid spray-coating. FIG. 3B presents data obtained for stearic acid powder and stearic acid spray-coating.

Figure 4A:
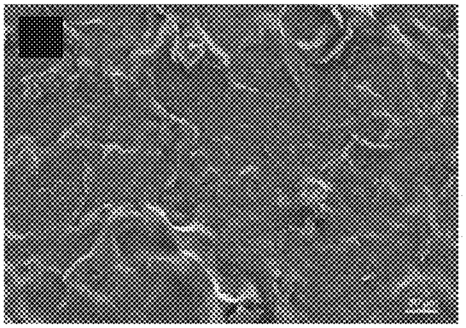
Figure 4B:
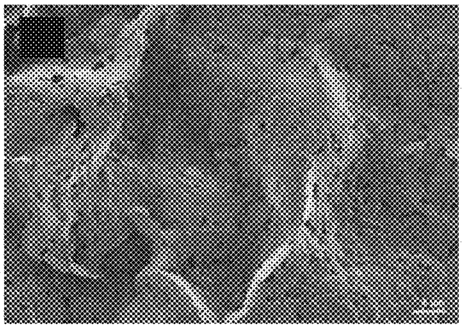
Figure 4C:
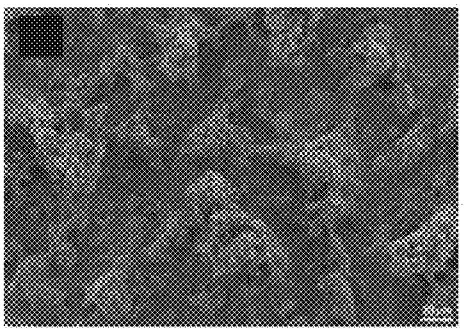
Figure 4D:
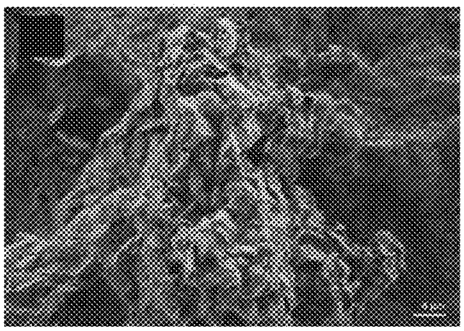
Figure 4E:
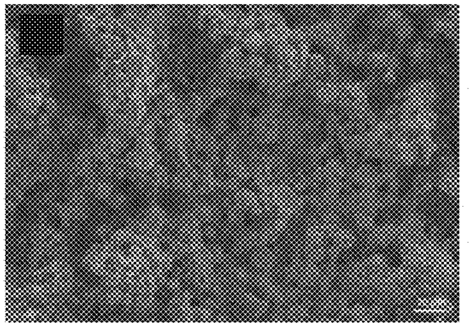
Figure 4F:
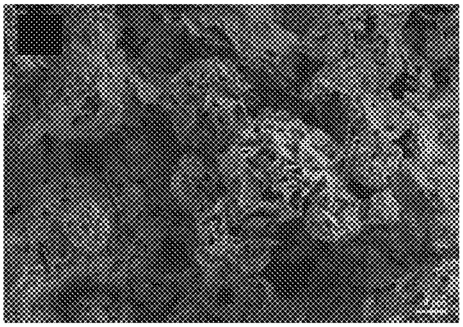
Figure 4G:
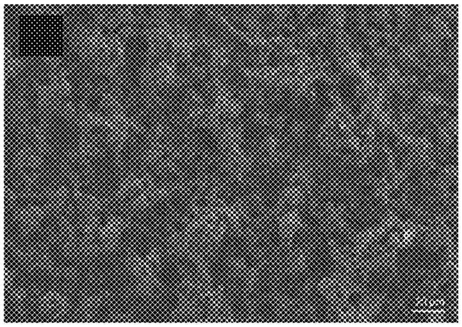
Figure 4H:
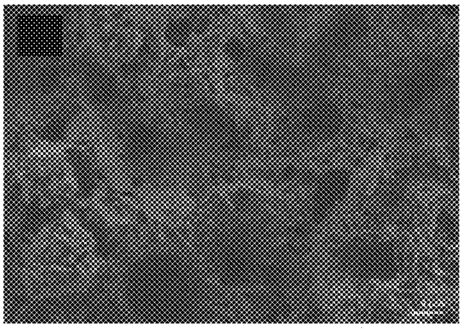

FIGS. 4A-H present HR-SEM micrographs of spray-coated surfaces prepared using a solution of stearic acid in EtOH (FIGS. 4A and 4B), a solution of stearic acid in acetone (FIGS. 4C and 4D), a solution of stearic acid in diethyl ether (FIGS. 4E and 4F), and a solution of palmitic acid in diethyl ether (FIGS. 4G and 4H). FIGS. 4A, 4C, 4E, and 4G: 1K magnification; FIGS. 4B, 4D, 4F, and 4H: 5K magnification.

Figure 5:
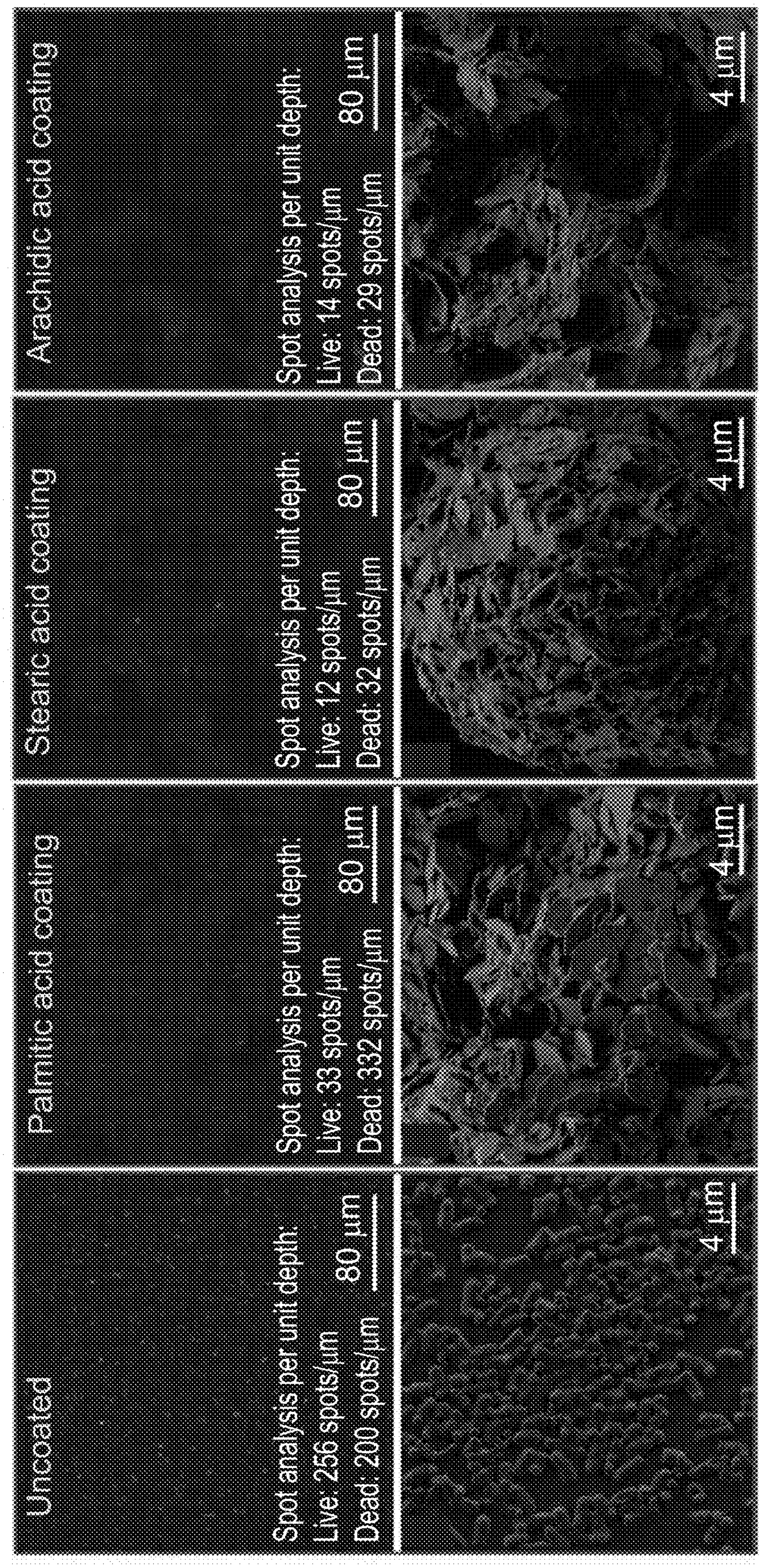

FIG. 5 presents data demonstrating anti-bacterial activity against gram-negative *Escherichia Coli* ATCC 8739, and show confocal images (upper panel) and corresponding HR-SEM images (lower panel) of uncoated glass surface, and of glass surfaces having applied thereof palmitic acid coating, stearic acid coating), arachidic acid coating), acquired after incubation in bacteria medium for 48 hours.

Figure 6A:
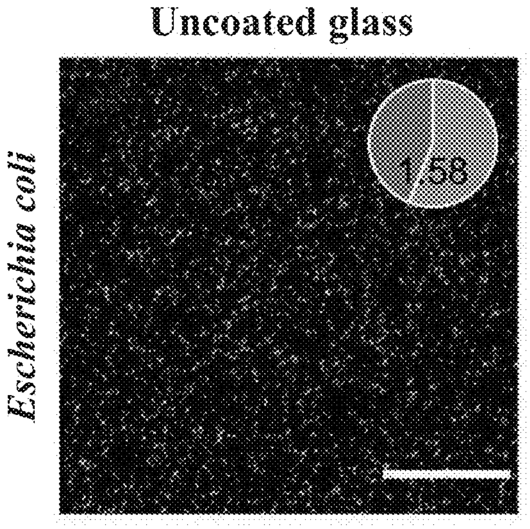
Figure 6B:
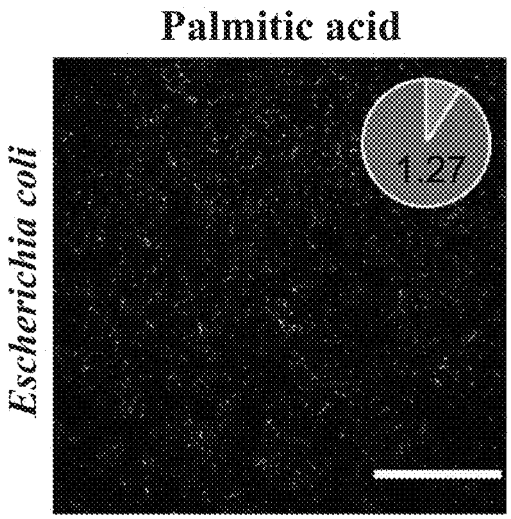
Figure 6C:
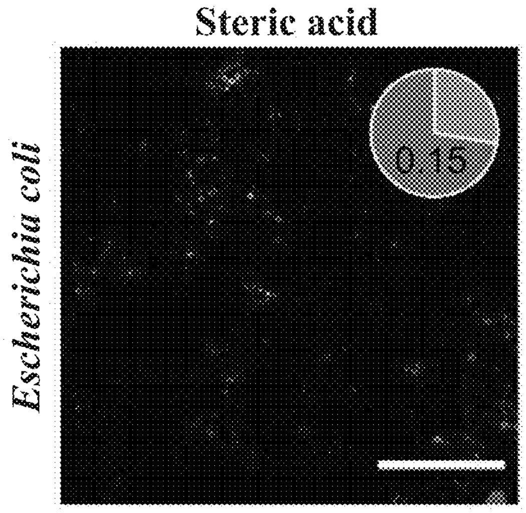
Figure 6D:
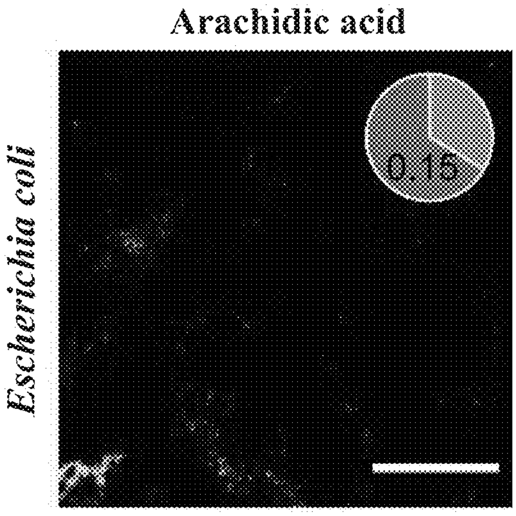
Figure 6E:
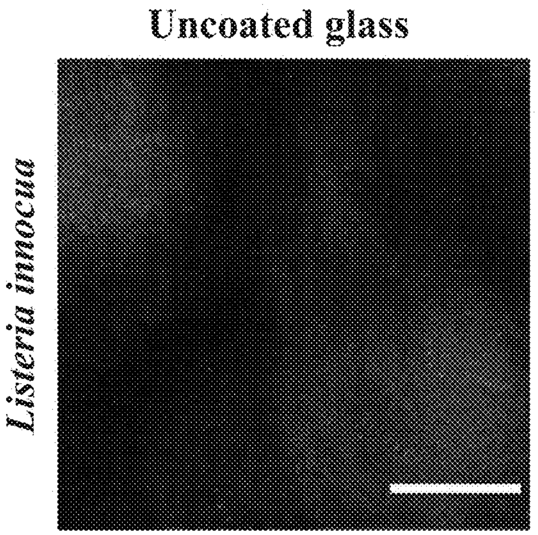
Figure 6F:
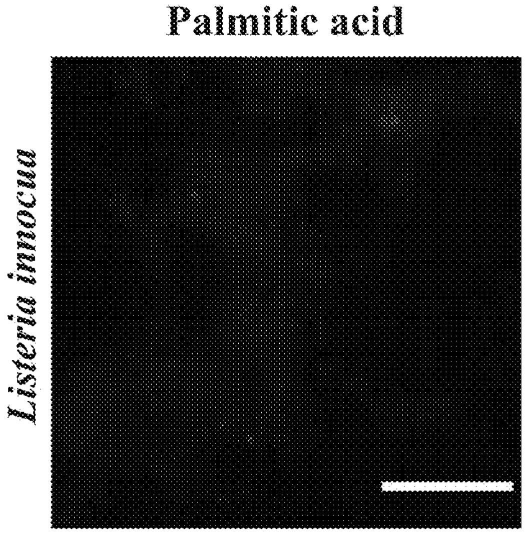
Figure 6G:
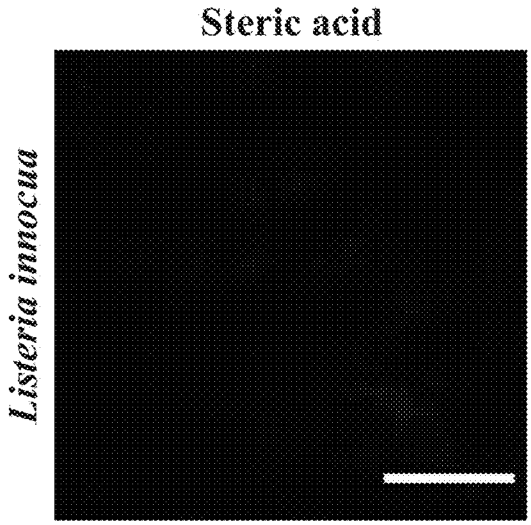
Figure 6H:
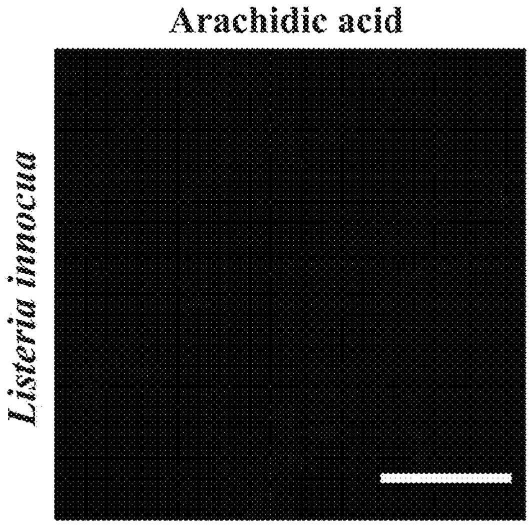
Figure 6I:
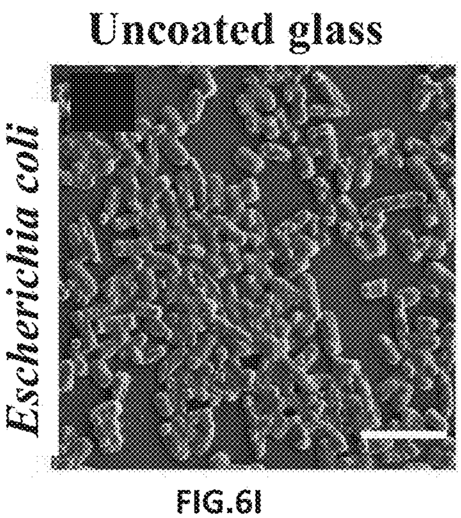
Figure 6J:
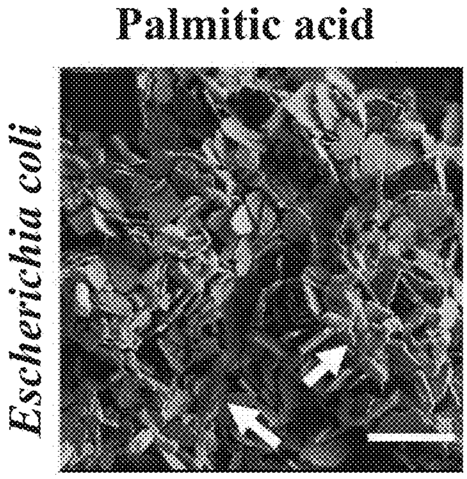
Figure 6K:
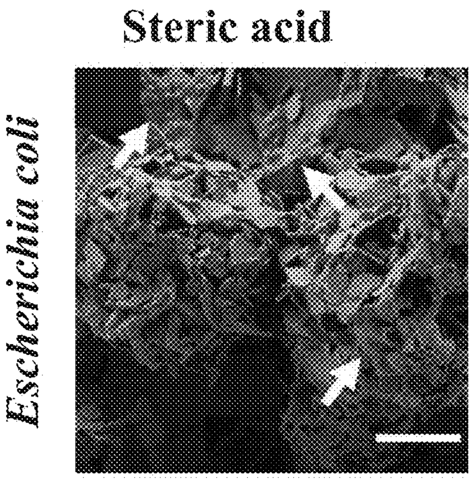
Figure 6L:
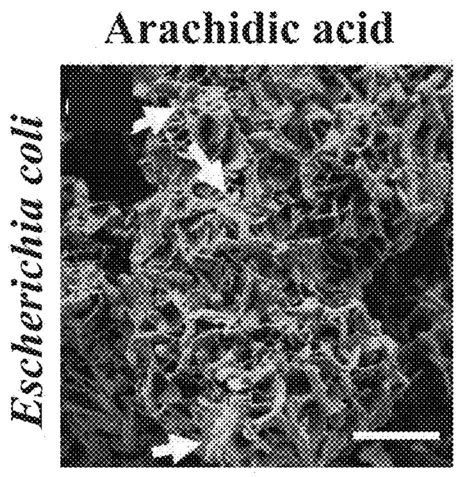
Figure 6M:
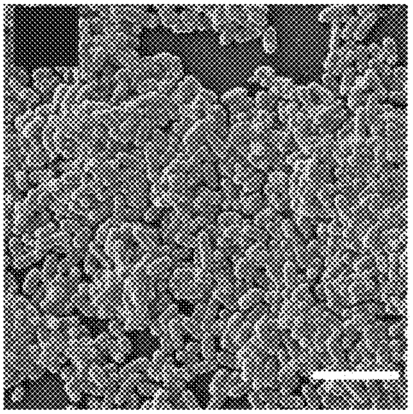
Figure 6N:
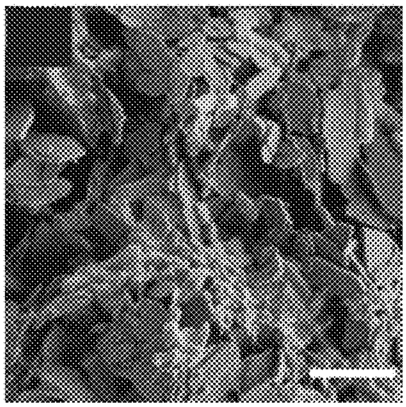
Figure 6O:
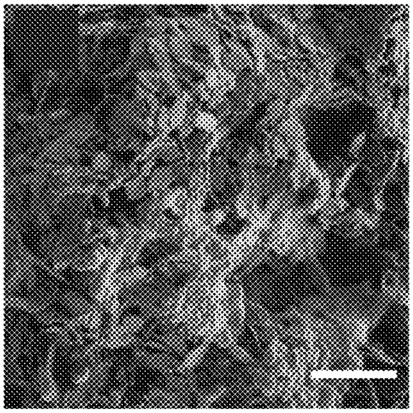
Figure 6P:
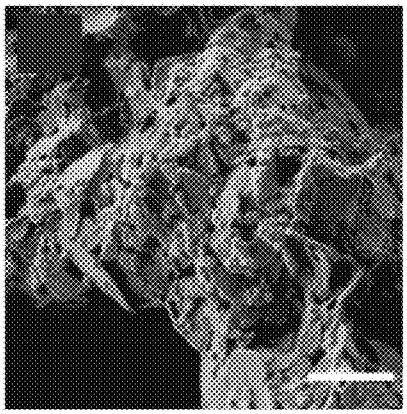

FIGS. 6A-P present data showing the adherence of Gram-negative *Escherichia Coli* ATCC 8739 (FIGS. 6A-D and 6I-L) and Gram-positive *Listeria Innocua* ATCC 33090 (FIGS. 6E-H and 6M-P) to uncoated glass (control), and to a glass surface spray-coated with palmitic acid-containing, stearic acid-containing, and arachidic acid-containing compositions (from leftmost to rightmost, respectively). FIGS. 6A-H present CLSM Z-projection images of the adhered bacteria. Scale bar is 80 μm. The insets indicate total bacteria density per unit area, normalized per unit depth (cells $\mu m^{-3}$). Green and red sections represent live and dead cells, respectively. FIGS. 6E-P present HR-SEM images of the adhered bacteria. Scale bar is 4 m. Bacteria cells were false-colored to ease observation.

Figure 7A:
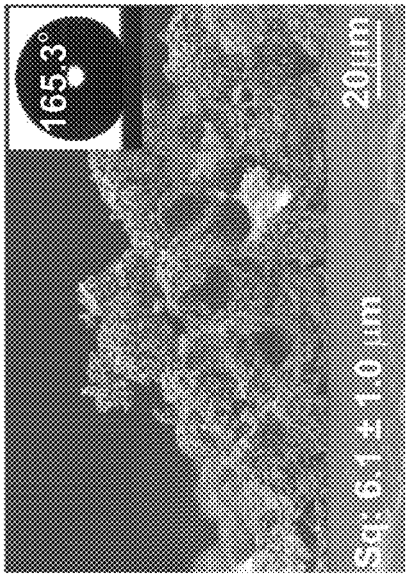
Figure 7B:
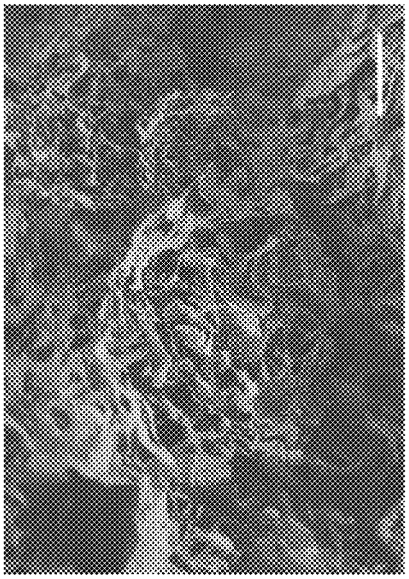
Figure 7C:
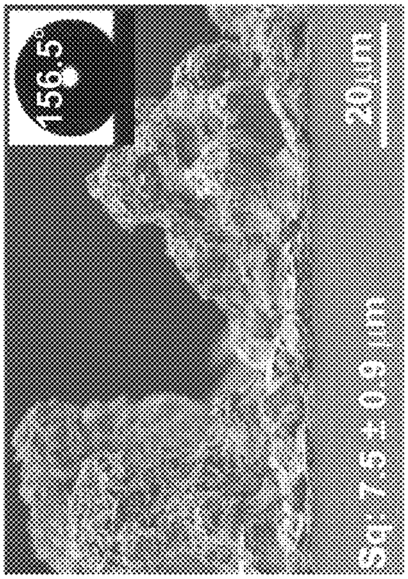
Figure 7D:
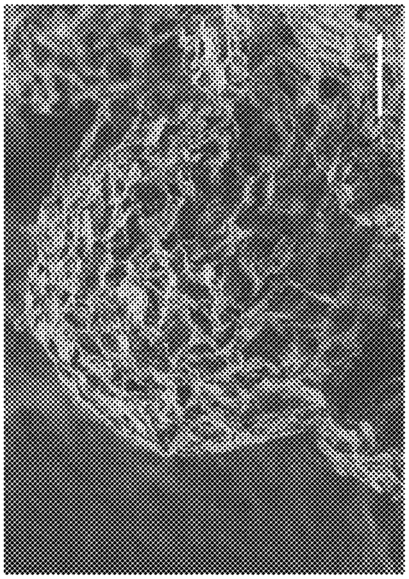
Figure 7E:
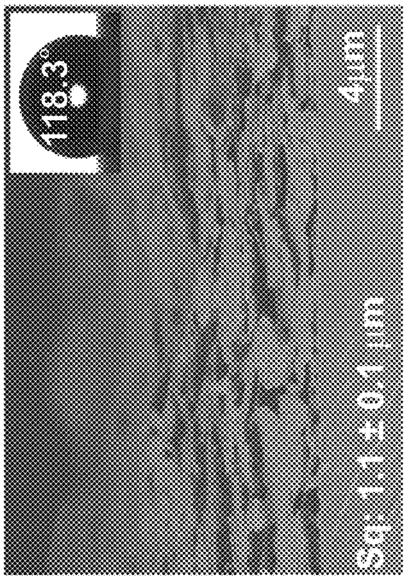
Figure 7F:
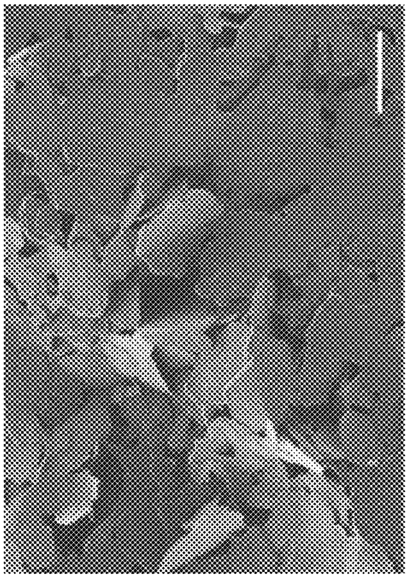
Figure 7G:
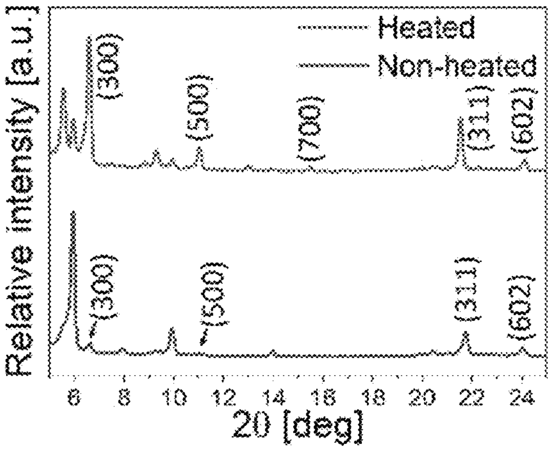
Figure 7H:
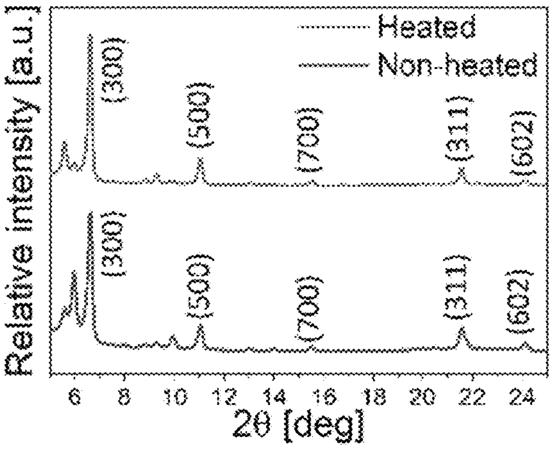
Figure 7I:
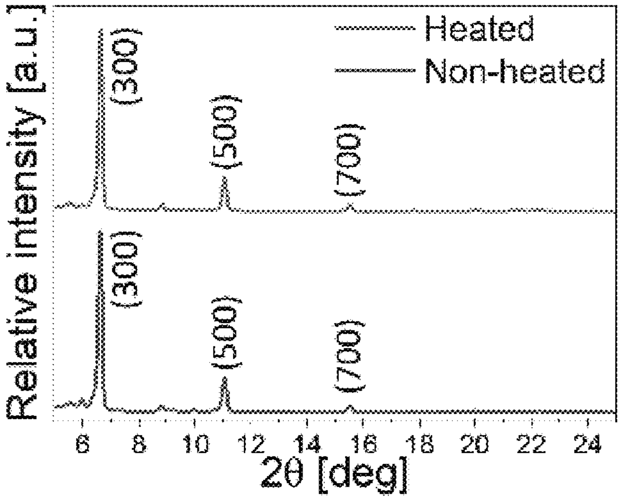

FIGS. 7A-I present HR-SEM (FIGS. 7A-F) and XRD (FIGS. 7G-I) characterization of glass slides having spray-deposited thereon a layer of stearic acid-containing composition, based on various solvents: diethyl ether (FIGS. 7A, 7B, and 7G); acetone (FIGS. 7C, 7D, and 7H); and ethanol (FIGS. 7E, 7F, and 7I). Cross-sectional views are presented in FIGS. 7A, 7C, and 7E, respectively, and the insets therein indicate water contact angle (upper right corner) and roughness (bottom left) values. Planar views of the coatings are presented in FIGS. 7B, 7D, and 7F; Scale bar is 4 μm. FIGS. 7G-I present XRD analyses of stearic acid-containing spray coatings before (blue) and after (red) heating for 24 hours at 50° C.

Figure 8A:
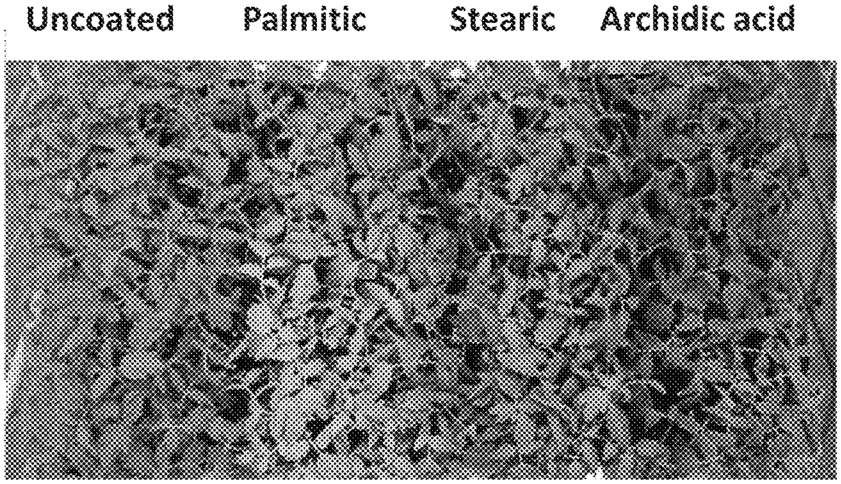
Figure 8B:
Figure 8C:
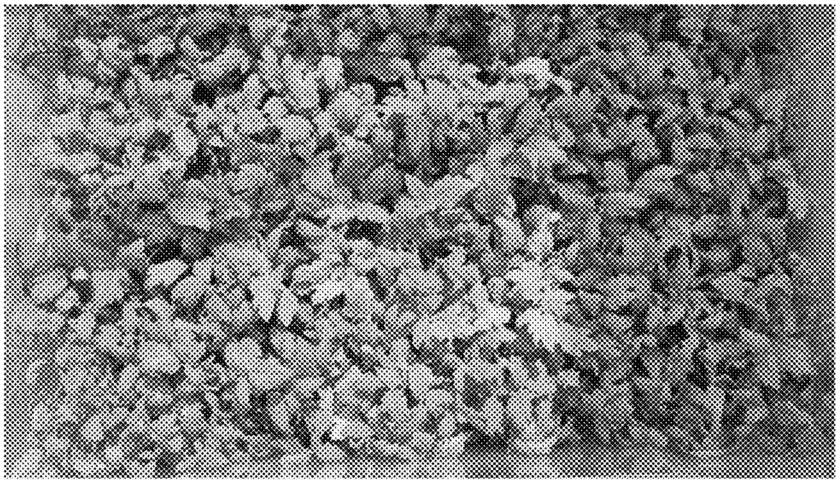

FIGS. 8A-C are photographs of tomato plants, untreated or spray-coated with palmitic acid-containing, stearic acid-containing, and arachidic acid-containing compositions over time. FIG. 8A presents t=0; FIG. 8B presents t=11 days; and FIG. 8C presents t=24 days.

Figure 9A:
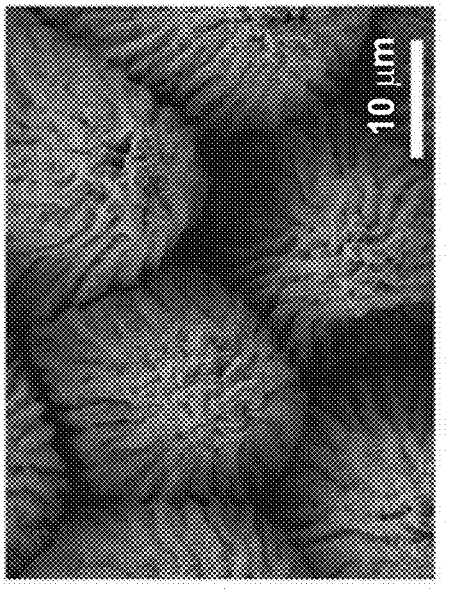
Figure 9B:
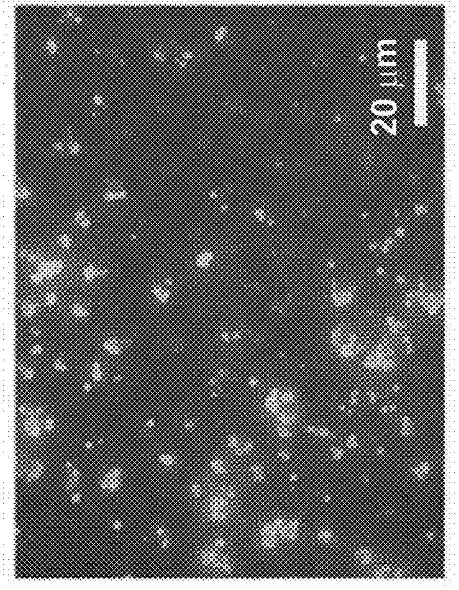
Figure 9C:
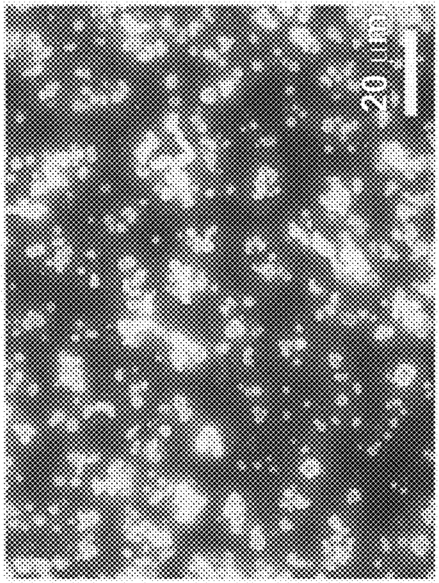
Figure 9D:
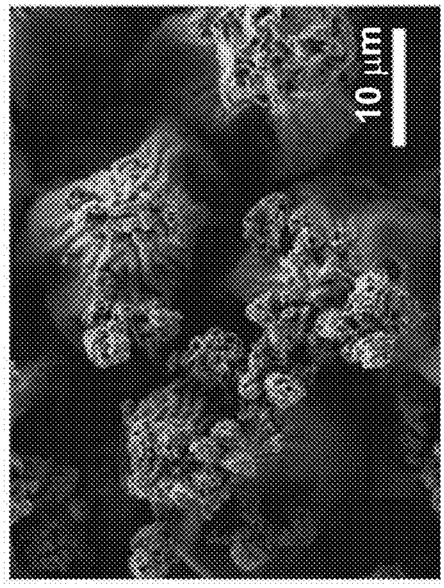
Figure 9E:
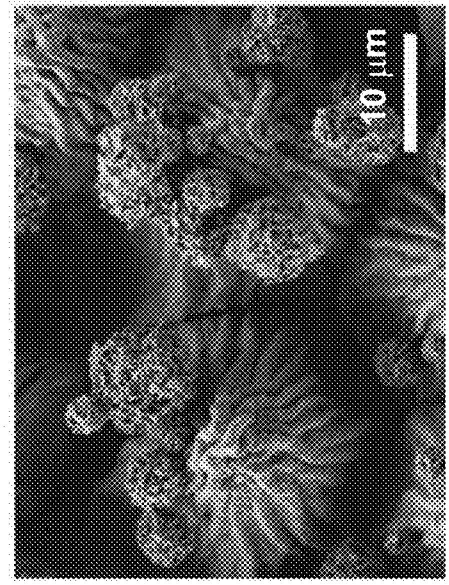
Figure 9F:
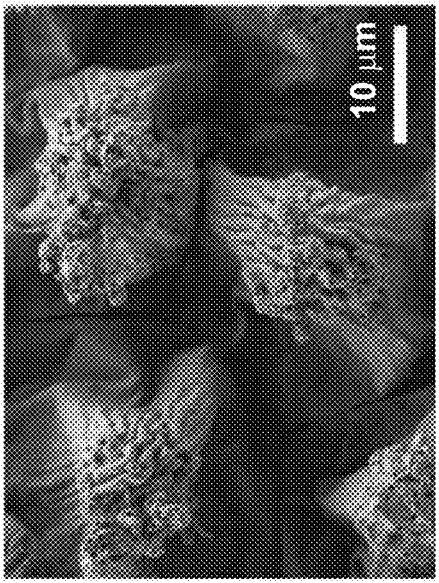

FIGS. 9A-F present SEM (FIGS. 9A, and 9D-F) and optical microscope (FIGS. 9B and 9C) images of spray-coated rose petals. SEM images show uncoated rose petal (FIG. 9A), and rose petals spray-coated with palmitic acid-containing (FIG. 9D); stearic acid acid-containing (FIG. 9E); and arachidic acid-containing (FIG. 9F) compositions. FIGS. 9B and 9C present optical microscope images of palmitic acid, lightly (FIG. 9B) and densely (FIG. 9C) sprayed on a rose petal.

Figure 10A:
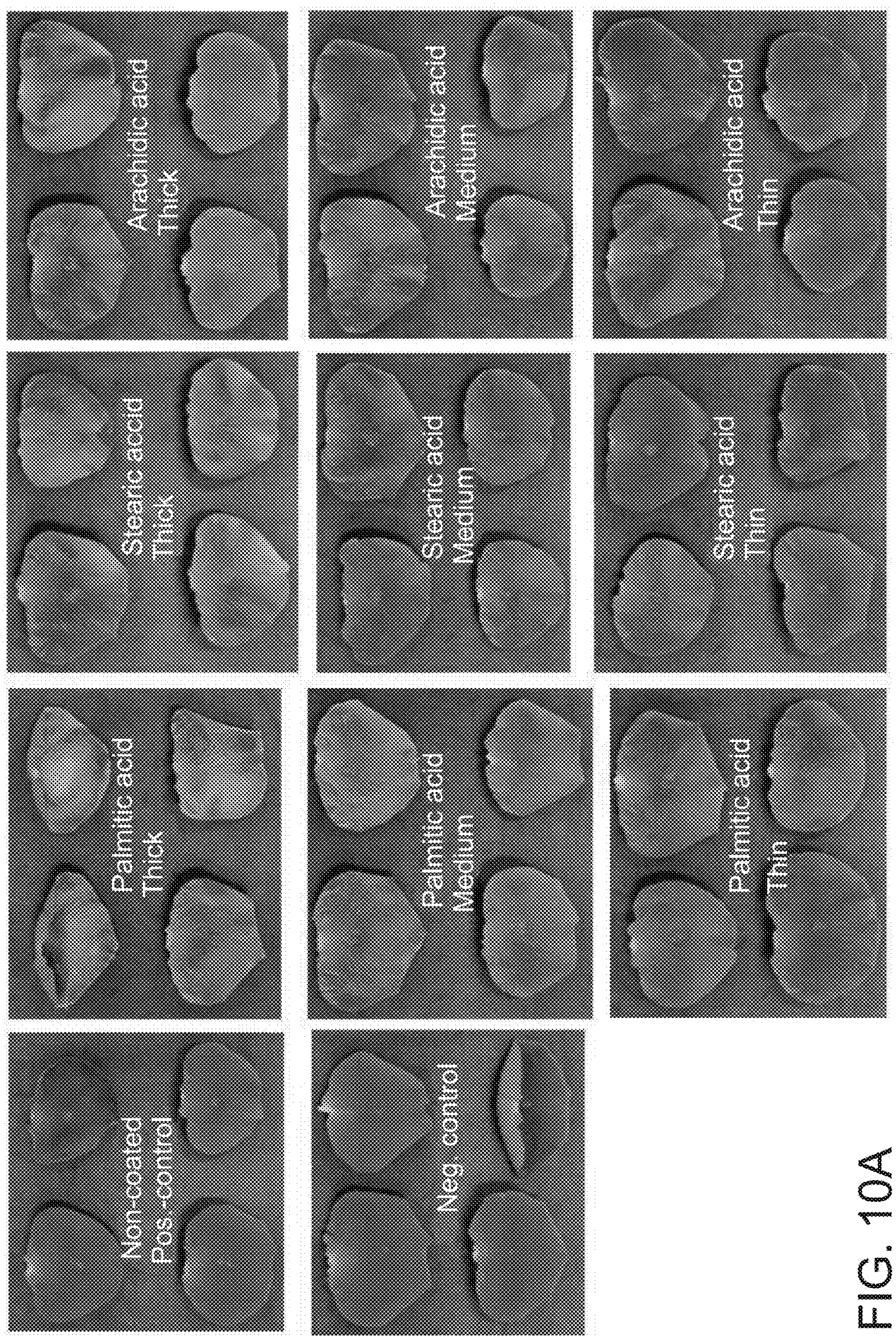
Figure 10B:
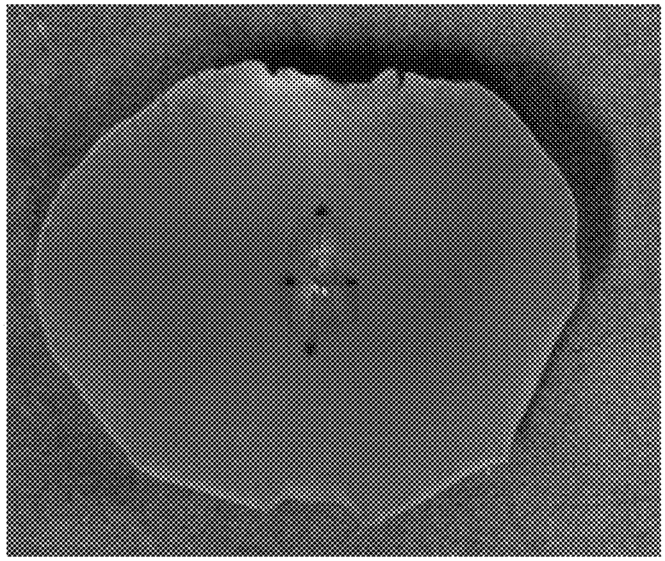
Figure 10C:
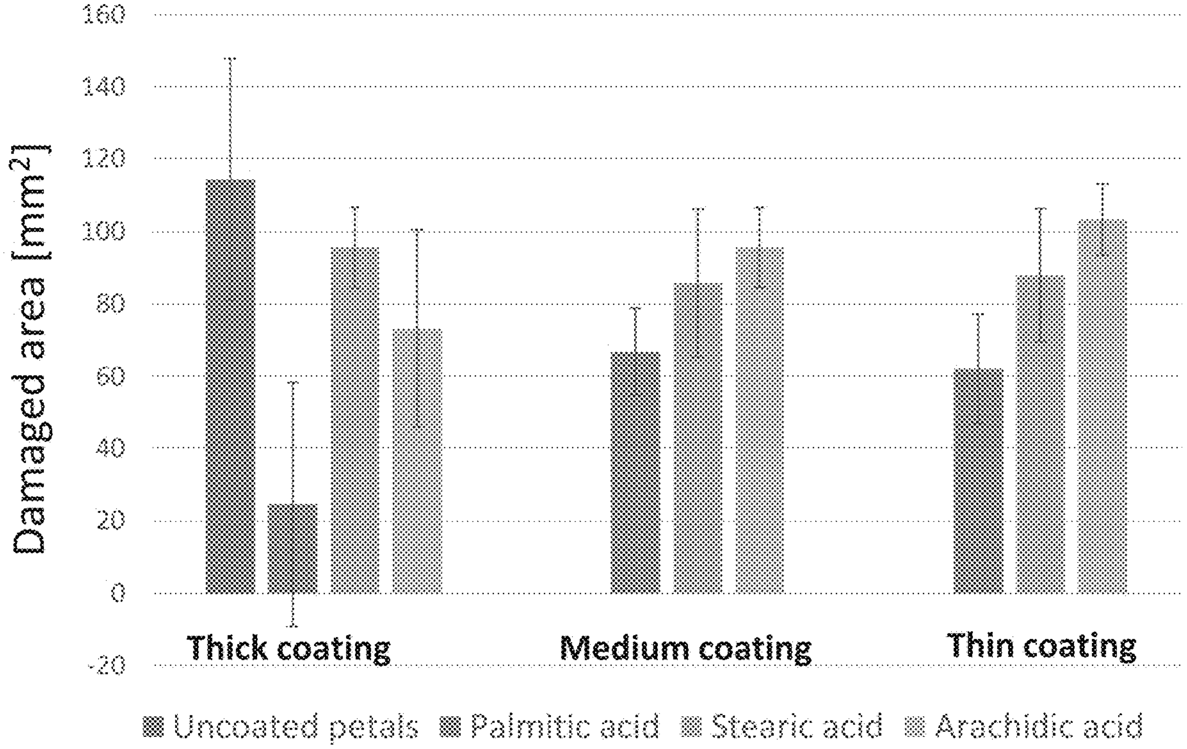

FIGS. 10A-C present data obtained following 72 hours incubation of *Botrytis cinerea* on rose petals in the absence and presence of thick, medium, and thin sprayed layers of palmitic acid-containing, stearic acid-containing, and arachidic acid-containing compositions. FIG. 10A presents photographs of the rose petals following 72 hours exposure of rose petals to *Botrytis cinerea* spores in the absence and presence of fatty acid-containing compositions deposited by spray-coating; FIG. 10B illustrates the calculation of the rose petal surface area damaged by *Botrytis Cinerea*; and FIG. 10C presents the calculated area of damage rose petals caused by *Botrytis Cinerea.*

Figure 11A:
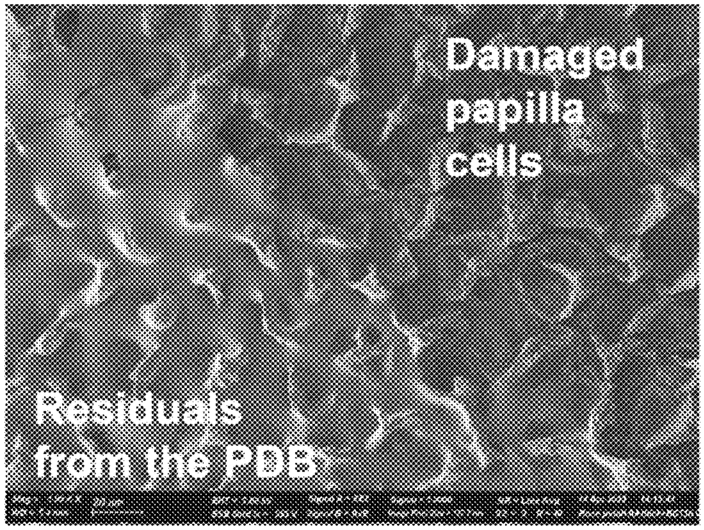
Figure 11B:
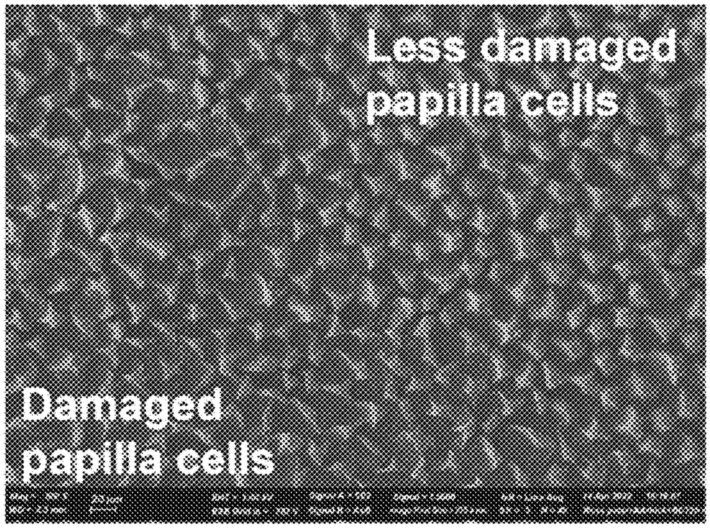
Figure 11C:
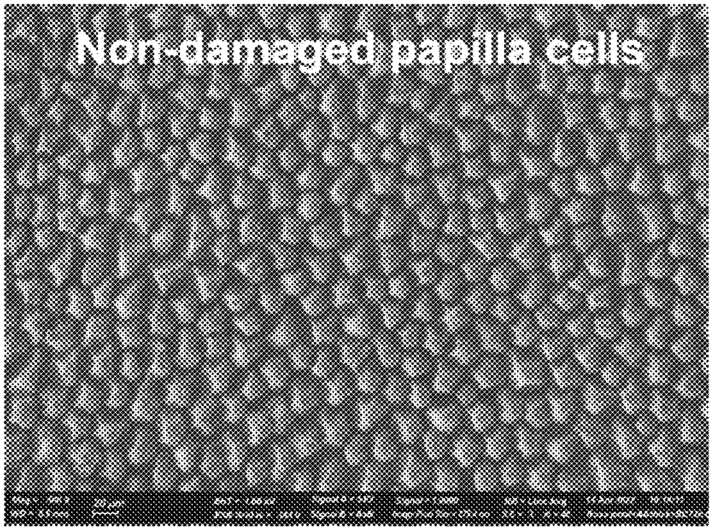

FIGS. 11A-C present SEM images of papilla cell in a rose petal as a function of the distance from a *Botrytis cinerea* infected area. FIG. 11A is closest to the infection center, FIG. 11B is farther away, and FIG. 11C is an image taken farthest from the infected area.

Figure 12A:
Figure 12B:
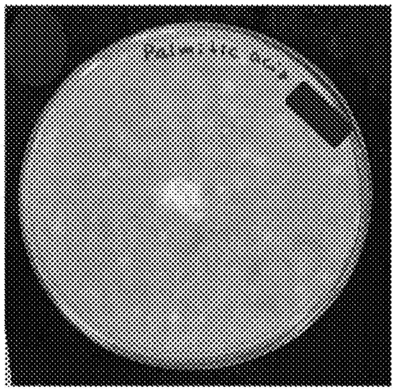
Figure 12C:
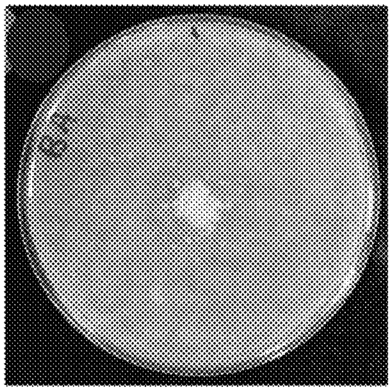
Figure 12D:
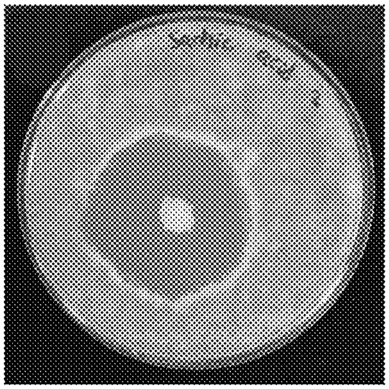
Figure 12E:
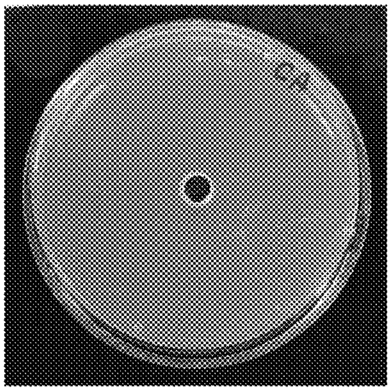

FIGS. 12A-E present photographs of developed *Botrytis cinerea* on agar plates after 72 hours incubation in the absence (FIG. 12A) and presence of palmitic acid (FIG. 12B); behenic acid (FIG. 12C); sorbic acid (FIG. 12D); and caprylic acid (FIG. 12E).

Figure 13:
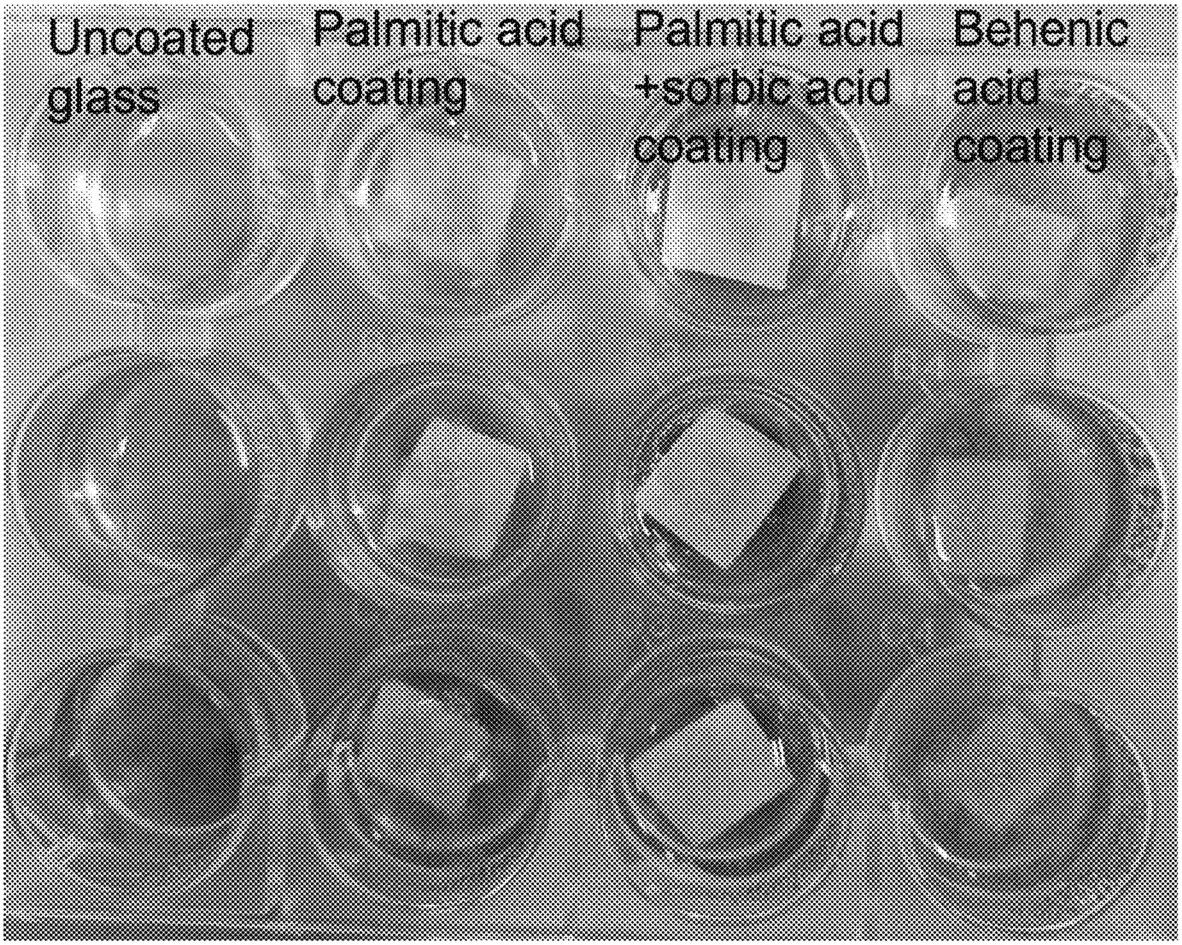

FIG. 13 is a photograph showing glass slides after 72 hours incubation with *Botrytis cinerea* suspension at 24° C. The slides were untreated (control, leftmost column) or spray-coated with diethyl ether 20 mg/ml solutions of palmitic acid-containing, a combined palmitic acid and sorbic acid-containing, and behenic acid-containing compositions (from the second left column to the rightmost column, respectively). The coatings composition is mentioned above each column (triplicates).

DESCRIPTION OF SPECIFIC EMBODIMENTS OF THE INVENTION

The present invention, in some embodiments thereof, relates to material science and, more particularly, but not exclusively, to a process of depositing a hydrophobic or superhydrophobic layer on a substrate's surface, and to substrates featuring a hydrophobic or superhydrophobic surface and articles containing such substrates, obtainable thereby. The process is usable for reducing a load of a pathogenic microorganism and/or for preventing biofilm formation on and/or in the substrates and articles-of-manufacturing.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The present inventors have designed and successfully practiced superhydrophobic coatings that can be applied via spray deposition onto the surfaces of various substrates (e.g., polymers, metals, glass, various fabrics, food products and agricultural crops).

The sprayable coatings can be used to impart to a coated surface exceptional properties such as superhydrophobicity, self-cleaning, easy-cleaning, anti-fouling, anti-icing, anti-fogging, and anti-dripping. The production method includes a single-step deposition route of spraying a solution of a fatty acid in an organic solvent onto a surface of a substrate, typically at ambient temperature. The main technical function of such coatings is to prevent the adhesion and maturation of microorganisms in a passive manner (without using antimicrobial substances that are unsafe for use and/or are environmentally unfriendly) due to the natural intrinsic superhydrophobicity and hierarchical structure of the coating.

The present inventors have demonstrated that the coated surfaces exhibit desired superhydrophobic properties when coated with various fatty acid-containing compositions, while the properties and morphology of the coated surfaces depended mainly on the fatty acid used as well as on the organic solvent (FIGS. 7A-I).

The present inventors have further demonstrated that upon spray coating various surfaces (FIGS. 1A-C and 2), the deposited fatty acid self-assembles into highly hierarchical crystalline structures, resulting in surfaces that exhibit a high water contact angle (CA) of, e.g., more than 150° and a low contact angle hysteresis (CAH), e.g., lower than 6°, while their properties and morphology depended mainly on the fatty acid used as well as on the organic solvent (FIGS. 3A, 3B, and 4A-H).

The present inventors have further demonstrated that the spray-coated fatty acid-containing compositions provide anti-biofouling and anti-microbial properties against *Escherichua coli* and *Listeria innocua* (FIGS. 5 and 6A-P), and anti-fungal activity against *Botrytis cinerea* (FIGS. 10A-C, 11A-C, 12A-E and 13), which were used as model Gram-negative bacterial strain, Gram-positive bacterial strain, and a fungal species, respectively.

The present inventors have further demonstrated the effect of sprayed fatty acid-containing compositions on agricultural crops (FIGS. 10A-C). FIGS. 9A-F and 11A-C demonstrate that the amount of rose petal cells damaged by *Botrytis cinerea* is decreased when fatty-acid containing compositions are deposited in and/or on the petals.

Embodiments of the present invention relate to a process/method of providing a hydrophobic, and preferably a superhydrophobic, surface of a substrate by spraying on the surface a fatty acid-containing solution, which is usable, for example, to prevent and/or reduce biofilm formation on the substrate's surface, to substrates having a fatty acid-containing composition deposited thereon and to articles-of-manufacturing containing such substrates, obtainable using the process/method.

By being based on fatty acids, the deposited compositions according to the present embodiments are edible or safely used compositions in the context of edible products and/or food contact substances.

The Process:

According to an aspect of some embodiments of the present invention there is provided a process of depositing (or applying) a hydrophobic or superhydrophobic layer on at least a portion of a surface of a substrate, the process comprising spraying onto the at least a portion of the surface a solution comprising a fatty acid and an organic solvent (also referred to herein as a fatty acid-containing solution).

By "surface" it is meant a portion of, or the entire, external surface of the substrate. The layer deposition/application can be effected on one or more portions of the substrate's surface, in a continuous or intermittent manner.

Herein, the surface or a portion thereof onto which the fatty acid-containing solution has been deposited is also referred to as a surface having deposited/applied on at least a portion thereof a fatty acid-containing composition/layer/film, or simply as a spray-coated or coated surface, all of which are used herein interchangeably.

As used herein and in the art, the expressions "hydrophobic", "hydrophobicity" and grammatical diversions thereof, refer to a property reflected by water repellency. The degree of hydrophobicity of surfaces is typically and acceptably determined by contact angle measurements with water or aqueous solutions.

Typically, a substrate's surface is considered hydrophobic when it exhibits a static water contact angle of at least 900 with water. A substrate's surface is considered superhydrophobic when it exhibits a static water contact angle of at least 1500 with water.

As used herein, a "static contact angle" describes the angle that a liquid substance forms with respect to the surface at the place where the free surface of quiescent liquid contacts with the horizontal surface of the substrate.

Typically, but not exclusively, in order to measure the static contact angle, a drop of liquid is formed on the tip of a hypodermic needle attached to a screw syringe. The syringe is fastened to a stand which reduces any irregularities that are produced by manual drop deposition. The substrate is then raised until it touches the drop using the Y control of the stage. The drop is then brought into the field of view and onto the focal point of the microscope by x-y translation of the stage and an image is captured. The static contact angle is calculated by methods known in the art. An exemplary methodology and system for measuring a static contact angle is described in the Examples section that follows.

The static contact angle of a surface corresponds to a tested liquid.

When a liquid is hydrophilic or amphiphilic, e.g., water, a static contact angle of at least 90° is indicative for hydrophobicity of a substrate's surface.

When a liquid is hydrophilic or amphiphilic, e.g., water, a static contact angle of at least 140° is indicative for superhydrophobicity of a substrate's surface.

As used herein and in the art, a "hydrophilic liquid" is a substance which is liquid at room temperature and which readily interacts with or is dissolved by water and/or other polar substances.

Hydrophilic, amphiphilic and hydrophobic substances can be determined by the partition coefficient thereof. A partition coefficient is the ratio of concentrations of a compound in the two phases of a mixture of two immiscible liquids at equilibrium. Normally, one of the solvents chosen is water while the second is hydrophobic such as octanol. The logarithm of the ratio of the concentrations of the un-ionized solute in the solvents is called Log P.

Hydrophobic liquids are characterized by Log P higher than 1; hydrophilic liquids are characterized by Log P lower than 1 and amphiphilic liquids are characterized by Log P of about 1 (e.g., 0.8-1.2). Exemplary hydrophilic liquids include, but are not limited to, water, aqueous solutions, and any other liquids which are polar and dissolvable in water (water-miscible) and/or which feature Log P of no more than 1 in a water/n-octanol scale.

An "amphiphilic liquid" is a substance which is liquid at room temperature and which possesses both hydrophilic and lipophilic properties. Amphiphilic liquids are typically organic substances which comprise both polar and non-polar groups.

Amphiphilic liquids may dissolve in water and to some extent in non-polar organic solvents. When placed in an immiscible biphasic system consisting of aqueous and organic solvent an amphiphilic liquid is partitioned between the two phases. The extent of the hydrophobic and hydrophilic portions of the substance determines the extent of partitioning.

Exemplary amphiphilic liquids include, but are not limited to, sugars, polyalcohols (e.g., glycerols), alkylene glycols (e.g., ethylene glycol).

In some embodiments, when the static contact angle is measured for water or other hydrophilic liquids as the liquid, the surface, or a portion thereof, having the fatty acid-containing layer deposited thereon is characterized by a static contact angle of 150° or higher, for example, of 160° or higher, of 170°, and even higher.

In exemplary embodiments, the static contact angle of the surface having the fatty acid-containing layer deposited thereon is at least 150°, at least 160° and even at least 170°, wherein the liquid is a hydrophilic or amphiphilic liquid such as, for example, water, glycerol, ethylene glycol or combination thereof.

Such static contact angles are indicative of a superhydrophobicity of the surface.

The contact angle hysteresis (CAH) is the difference between the advancing contact angle and the receding contact angle in resistance to motion of the fluid droplet. If the contact angle hysteresis is larger than the light induced contact angle change, contact hysteresis occurs, and movement of the fluid is slowed or stopped.

This hysteresis effect can be caused by the interaction of the receding edge with the surface. For example, attractive interactions between the surface and the fluid at the receding edge can retard motion of the fluid droplet. Hysteresis can make the driving force smaller and hence slow the speed of movement. Hysteresis can be overcome by using very rough surfaces in combination with surface modification by hydrophobic molecules. At a constant velocity the driving force equals the drag force; hence, the smaller the drag force the lower the velocity, a small difference means a slower velocity.

In exemplary embodiments, the contact angle hysteresis of the surface (or a portion thereof) having the fatty acid-containing layer deposited thereon is no more than 20°, or no more than 15°, or no more than 12°, or no more than 10°, or no more than 70, or no more than 6°, wherein the liquid is a hydrophilic or amphiphilic liquid such as, for example, water, glycerol, ethylene glycol or combination thereof.

According to some of any of the embodiments described herein, the at least a portion of the surface that has the layer deposited thereon features roughness of at least 0.2, or at least 1, or at least 2, or at least 3, micrometers.

The term "roughness" as used herein relates to the irregularities in the surface texture. Irregularities are the peaks and valleys of a surface.

In some embodiments, roughness value is computed by AA (arithmetic average) and RMS (root-mean-square). The AA method uses the absolute values of the deviations in the averaging procedure, whereas the RMS method utilizes the squared values of the deviations in the averaging process.

RMS roughness ($R_q$) is typically calculated according to the following formula:

$$R_q = \sqrt{\frac{1}{n}\sum_{i=1}^{n} y_i^2}$$

wherein n represents ordered, equally spaced points along the trace, and $y_i$ is the vertical distance from the mean line to the $i^{th}$ data point.

RMS can be measured by confocal microscopy, as described in the Examples section that follows.

According to some of any of the embodiments described herein, the at least a portion of the surface that has the layer deposited thereon features roughness of from 1 to 50, micrometer.

According to some of any of the embodiments described herein, the at least a portion of the surface that has the layer deposited thereon features roughness of from 3 to 30, micrometer.

According to some of any of the embodiments described herein, the hydrophobic or superhydrophobic surface (or a portion thereof) features roughness of at least 0.2 micrometer, preferably at least 0.5, or at least 1, or at least 2, more preferably at least 3, micrometers. According to some of any of the embodiments described herein, the superhydrophobic surface (or a portion thereof) features roughness that ranges from 0.1 to 50, or from 1 to 50, or from 1 to 40, or from 1 to 30, or from 2 to 50, or from 2 to 40, or from 2 to 30, or from 3 to 50, or from 3 to 40, or from 3 to 30, or from 3 to 25, including any intermediate values and subranges therebetween.

According to some of any of the embodiments described herein, upon spraying the fatty acid-containing solution, the obtained fatty acid-containing layer features a porosity that ranges from about 10% to about 90%, or from about 10% to about 85%, or from about 20% to about 85%, by volume, including any intermediate values and subranges therebetween. In some embodiments, the layer features a porosity of at least 20%, or at least 30%, or at least 40%, or at least 45%, by volume.

According to some of any of the embodiments described herein, the fatty acid-containing layer features a porosity that ranges from 10 to 85% by volume, or from 40 to 85%, by volume.

In some of any one of the embodiments described herein, the fatty acid-containing solution is applied on the substrate's surface (or a portion thereof) without modifying the substrate's surface prior to the deposition.

In some of any one of the embodiments described herein, the fatty acid is applied on the substrate's surface (or a portion thereof) without modifying the substrate's surface crystallinity prior to the deposition.

According to some of any of these embodiments, the deposited/applied fatty acid-containing layer is crystalline, as presented, for example, in the X-ray diffractions (e.g., FIGS. 3A and 3B). The crystallinity can be determined by the width of the diffraction peaks (FWHM) and by the integrated intensity.

The process described herein is a spray-coating process, aimed at rendering a substrate's surface or a portion thereof hydrophobic or superhydrophobic, as described herein.

The deposited layer is a layer of a fatty acid-containing composition, and in some embodiments, the layer consists essentially of a fatty acid or a mixture of fatty acids.

According to some of any of the embodiments described herein, the deposited layer is in a form of a film, as described in further detail hereinafter.

Herein, the deposited layer is also referred to as a layer that comprises or consists of a fatty acid-containing composition.

As discussed herein, one underlying methodology of some embodiments of the present invention comprises depositing (applying) a fatty acid-containing solution on at least a portion of the surface of the substrate by spray coating.

As used herein, the term "spray coating" and grammatical diversions thereof, refers to a method of material deposition by means of spaying a liquid that comprises the material to be deposited. Typically, a material (fatty acid) to be deposited is mixed with a solvent (an organic solvent as described herein), and the obtained mixture or solution (a fatty acid-containing solution) is placed in a container equipped with a spraying mechanism (e.g., a commercial "air brush" or "air gun" device) and connected to a gas supply (e.g., in a form of a compressor, an aerosol propellant can, a $CO_2$ tank). The mixture is then forced out of the container as a spray so as to form a layer (e.g., film) of the material on a desirable surface or a portion thereof, typically upon evaporation of the solvent. The spraying can be performed several times on the surface, so as to form several layers of the deposited material. The thickness of the deposited material on the surface depends on the number of layers, and/or the number of spraying cycles.

According to some of any of the embodiments described herein, the spraying is performed such that the deposited layer has a thickness of at least 1 μm, or of at least 5 μm, for example, in a range of from 1 micrometer to about 50 micrometers, including any intermediate values and subranges therebetween, and as described hereinbelow. In some embodiments, the spraying provides a layer in a form of a film, as described herein.

Any commercially available, or otherwise known systems for performing spray coating can be used for practicing the method as described herein.

According to some of any of the embodiments described herein, the spraying is effected by means of a spray gun. Any commercially available or customary prepared spray gun can be used.

The spraying conditions are typically adjusted according to the selected spray gun and fatty acid solution. Exemplary, non-limiting conditions include: a gun nozzle having an orifice diameter that ranges from 1 to 3, or from 1 to 2, mm, for example, from 1.4 to 2.0 mm; air/propellant pressure of from about 4 to about 6 bars; and/or spray distance of from about 5 to about 50 cm, or from about 5 to about 40 cm, or from about 5 to about 30 cm, or from about 10 to about 50 cm, or from about 10 to about 40 cm, or from about 10 to about 30 cm, or from about 10 to about 20 cm, including any intermediate values and subranges therebetween.

Additional conditions that can be manipulated as desired include, but are not limited to, pulse duration, which preferably ranges from about 1 second to about 60 seconds, or from 0.5 to 10 seconds, or from 1 to 5 seconds; and/or a weight ratio between the air/propellant and the solution, which may range from about 1:1 to about 500:1.

According to some of any of the embodiments described herein, a diameter of the nozzle orifice ranges from about 1.4 to about 2.0 mm; and/or the spraying is performed at an air/propellant pressure that ranges from about 4 to about 6 bars; and/or the spraying is performed at a spray distance of from about 5 to about 30 cm, or from about 10 to about 20 cm; and/or a pulse duration of the spraying ranges from about 0.5 to about 10, or from 1 to 5 seconds.

Exemplary procedures for performing spray coating are described in further detail hereinbelow and in the Examples section that follows.

According to some of any of the embodiments described herein, the spraying is performed at room temperature.

According to some of any of the embodiments described herein, the spraying is performed using a spray gun, as described herein in any of the respective embodiments and any combination thereof, and at room temperature.

In some embodiments, depositing the fatty acid-containing layer onto a substrate can be effected, for example, by means of a hand-held container (e.g., bottle-shaped) equipped with a spray nozzle, and filled with the fatty acid-containing solution. The device can be equipped with a hand-operated trigger or valve, which, when operated, dispenses the fatty acid-containing solution through the spray nozzle. Alternatively or additionally, the device can include means for connecting the spray nozzle to a pressure source (e.g., a fluid source, such as, but not limited to, a source of pressurized water or air), such that the fatty acid-containing solution is dispensed from the container through the spray nozzle by means of the pressure applied by the pressure source.

Alternatively, spraying can be effected by passing the fatty acid-containing solution through the spray nozzle by means of a pump. Devices as described herein, which further comprise such a pump are therefore also contemplated. Wheeled machines having means for dispensing the fatty acid-containing solution through one or more spray nozzles, as a result of a pressure supplied by a pump, are also usable in the context of these embodiments.

Distribution of the fatty acid-containing solution can also be effected by means of a propeller, optionally connected to a pump.

Also contemplated are systems deployed for distributing the fatty acid-containing solution on relatively large areas (e.g., at least 100 square meters). Such a system can comprise a controller, a distribution system and a communication channel or network establishing communication between the controller and the distribution system. The controller optionally and preferably includes an electronic circuit configured for operating the distribution system. The system can also comprise a data processor which can be configured to vary the time intervals employed by the controller based on a predetermined criterion or set of criteria.

In case of applying a fatty acid-containing solution as described herein on agricultural substances, for example, the distribution system can be, for example, a liquid distribution system such as, but not limited to, a sprinkler system, a center-pivot irrigation system, a drip irrigation system, a mist sprayer system, and the like.

Fatty Acid-Containing Solution:

As is well known in the art, fatty acids are organic substances of the formula:

$$R—C(=O)—OH$$

wherein R is a saturated or unsaturated hydrocarbon chain of at least 5 carbon atoms in length, typically of from 5 to 40 carbon atoms, or from 5 to 31 carbon atoms, or from 7 to 31 carbon atoms, in length.

As used herein, the term "hydrocarbon" describes an organic substance having a backbone chain composed of carbon atoms linked to one another, and substituted by hydrogen atoms. The hydrocarbon can be linear or branched, and is preferably linear.

The fatty acid can be a saturated or unsaturated fatty acid.

In a saturated fatty acid, R is an alkyl of at least 5 or at least 7 carbon atoms in length, for example of from 7 to 31 carbon atoms.

In an unsaturated fatty acid, R is an unsaturated hydrocarbon (alkenyl) having one, two, three or more C═C double bond(s), through the hydrocarbon chain, of at least 5 or at least 7 carbon atoms in length, for example, from 7 to 31 carbon atoms. Each of double bonds can independently be of a cis or trans configuration.

Exemplary saturated and unsaturated fatty acids are provided in the Examples section that follows.

According to some of any of the embodiments described herein, the fatty acid is a saturated fatty acid.

According to some of any of the embodiments described herein, the fatty acid is of at least 12 carbon atoms in length, for example, R is an alkyl of from 11 to 31 carbon atoms.

According to some of any of the embodiments described herein, the fatty acid is of at least 16 carbon atoms in length, for example, R is an alkyl of from 15 to 27 carbon atoms in length.

According to some of any of the embodiments described herein, the fatty acid is at least 18 carbon atoms in length, for example, R is an alkyl of from 17 to 25 carbon atoms in length.

According to some of any of the embodiments described herein, the fatty acid is palmitic acid, having a total of 16 carbon atoms.

According to some of any of the embodiments described herein, the fatty acid is stearic acid, having a total of 18 carbon atoms.

According to some of any of the embodiments described herein, the fatty acid is arachidic acid, having a total of 20 carbon atoms.

According to some of any of the embodiments described herein, the fatty acid is behenic acid, having a total of 22 carbon atoms.

According to some of any of the embodiments described herein, the fatty acid is a single fatty acid and in some embodiments it is a mixture of two or more fatty acids. When two or more fatty acids are used, each can be a saturated or unsaturated fatty acid, and preferably at least one of the fatty acids is a saturated fatty acid having at least 12 carbon atoms, as described herein in any of the respective embodiments.

According to some of any of the embodiments described herein, the fatty acid is solid at room temperature.

According to some of any of the embodiments described herein, the fatty acid is capable of forming a solid layer (e.g., a film) when spray-coated as described herein.

According to some of any of the embodiments described herein, the fatty acid is a free fatty acid, and in some embodiments, the fatty acid is devoid of fatty acid esters, glycerides, and any other forms of fatty acids other than a free fatty acid.

A mixture of the fatty acid and a solvent for use in spray coating is typically a solution (namely, when at least 80 percent, or at least 90 percent, or all, of the fatty acid is dissolved in the solvent).

The solvent is typically an organic solvent, preferably a low boiling temperature organic solvent.

According to some of any of the embodiments described herein, the organic solvent has a boiling temperature lower than 70° C., or lower than 60° C.

According to some of any of the embodiments described herein, the organic solvent has a boiling temperature lower than 50° C.

According to some of any of the embodiments described herein, the organic solvent has an evaporation rate higher than 1, or higher than 2, or higher than 3, relative to n-butyl acetate, as accepted in the art.

According to some of any of the embodiments described herein, the organic solvent has an evaporation rate higher than 1, preferably higher than 2, preferably higher than 3, more preferably higher than 5, compared to (relative to) n-butyl acetate, as accepted in the art.

According to some of any of the embodiments described herein, the organic solvent has a low boiling temperature as described herein and a high evaporation rate as described herein in any of the respective embodiments.

Exemplary organic solvents that are usable in the context of the present embodiments include, without limitation, low-boiling alcohols (e.g., ethanol); low-boiling ethers (e.g., diethyl ether); ketones (e.g., acetone), and the like, and any mixture thereof.

Exemplary organic solvents include, without limitation, alcohols such as methanol, ethanol, and/or n-propanol; acetone, methyl ethyl ketone, dialkyl ethers such as diethylether, and any mixture thereof.

In exemplary embodiments, the organic solvent is acetone or diethylether.

The concentration of the fatty acid in the mixture or solution may range from 0.01% weight per the total volume of the solution, and up to the solubility limit of the fatty acid in a selected solvent. The concentration may further exceed the solubility limit by, e.g., 10 or 20% weight per volume.

In exemplary embodiments, a concentration of the fatty acid ranges from 1 to 100 mg/ml; or from 10 to 100 mg/ml, or from 10 to 50 mg/ml, or from 5 to 100 mg/ml, or from 5 to 50 mg/ml, or from 5 to 20 mg/ml, or from 10 to 30 mg/ml, or from 20 to 70 mg/ml, including any intermediate values and subranges therebetween.

In exemplary embodiments, a concentration of the fatty acid is about 20 mg/ml.

According to some of any of the embodiments described herein, the fatty acid is at least 18 carbon atoms in length and the organic solvent has an evaporation rate higher than 5 relative to n-butyl acetate.

According to some of these embodiments, the fatty acid is palmitic acid and the organic solvent has an evaporation rate higher than 5 relative to n-butyl acetate.

According to some of these embodiments, the fatty acid is stearic acid and the organic solvent has an evaporation rate higher than 5 relative to n-butyl acetate.

According to some of these embodiments, the fatty acid is arachidic acid and the organic solvent has an evaporation rate higher than 5 relative to n-butyl acetate.

According to some of any of the embodiments described herein, the fatty acid is at least 18 carbon atoms in length and the organic solvent is acetone.

According to some of any of the embodiments described herein, the fatty acid is at least 18 carbon atoms in length and the organic solvent is diethyl ether.

According to some of any of the embodiments described herein, the fatty acid is at least 18 carbon atoms in length and the organic solvent is methanol.

According to some of any of the embodiments described herein, the fatty acid is palmitic acid and the organic solvent is diethyl ether.

According to some of any of the embodiments described herein, the fatty acid is stearic acid and the organic solvent is diethyl ether.

According to some of any of the embodiments described herein, the fatty acid is arachidic acid and the organic solvent is diethyl ether.

According to some of any of the embodiments described herein, the fatty acid is at least 18 carbon atoms in length and a concentration of the fatty acid in the solution ranges from 5 to 50 mg/ml.

According to some of any of the embodiments described herein, the fatty acid is at least 18 carbon atoms in length and a concentration of the fatty acid in the solution ranges from 5 to 30 mg/ml.

According to some of any of the embodiments described herein, the fatty acid is at least 18 carbon atoms in length and a concentration of the fatty acid in the solution ranges from 10 to 30 mg/ml.

According to some of any of the embodiments described herein, the fatty acid is at least 18 carbon atoms in length, as described herein in any of the respective embodiments, the organic solvent has an evaporation rate higher than 5 relative to n-butyl acetate, as described herein in any of the respective embodiments, and a concentration of the fatty acid in the solution ranges from 5 to 50 mg/ml.

In exemplary embodiments, the fatty acid is at least 18 carbon atoms in length, as described herein in any of the respective embodiments, the organic solvent has an evaporation rate higher than 5 compared to n-butyl acetate, as described herein in any of the respective embodiments, and a concentration of the fatty acid in the solution ranges from 5 to 20 mg/ml.

According to some of any of the embodiments described herein, the fatty acid is at least 18 carbon atoms in length, as described herein in any of the respective embodiments, the organic solvent has an evaporation rate higher than 5 compared to n-butyl acetate, as described herein in any of the respective embodiments, and a concentration of the fatty acid in the solution ranges from 5 to 50 mg/ml.

According to some of any of the embodiments described herein, the fatty acid is at least 18 carbon atoms in length, as described herein in any of the respective embodiments, the organic solvent has an evaporation rate higher than 5 compared to n-butyl acetate, as described herein in any of the respective embodiments, and a concentration of the fatty acid in the solution ranges from 5 to 30 mg/ml.

According to some of any of the embodiments described herein, the fatty acid is at least 18 carbon atoms in length, as described herein in any of the respective embodiments, the organic solvent has an evaporation rate higher than 5 compared to n-butyl acetate, as described herein in any of the respective embodiments, and a concentration of the fatty acid in the solution ranges from 5 to 20 mg/ml.

According to some of any of the embodiments described herein, the solution further comprises one or more additives, such as, but not limited to, coloring agents and/or anti-microbial agents. Preferably the additives are edible or at least are considered safe for use in animated subjects (e.g., animals and plants). In exemplary embodiments, the additives are considered as food contact substances or as generally recognized as safe (GRAS) substances as described herein.

According to some of any of the embodiments described herein, the solution further comprises an anti-microbial agent.

Alternatively, an anti-microbial agent can be co-applied onto the at least a portion of the substrate with the fatty acid-containing solution as described herein in any of the respective embodiments. The anti-microbial agent can be applied to the substrate's surface prior to, subsequent to or concomitant with the deposition of the fatty acid-containing solution by spray-coating.

Exemplary anti-microbial agents include, but are not limited to, anti-microbial lipids (e.g., triglycerides; short to medium fatty acids), antiseptic agents, antibiotic, and anti-fungal agents.

The term "anti-microbial lipids" as used herein refers to single-chain lipid amphiphiles, that are able to interact with microbial (e.g., bacterial or fungal) cells and exhibit anti-microbial activity.

Exemplary antimicrobial lipids include triglycerides, saturated and unsaturated, branched and unbranched fatty acids, typically short to medium fatty acids (e.g., of no more than 12 carbon atoms).

According to some of any of the respective embodiments, the additional anti-microbial agent is an edible substance.

According to some of any of the embodiments described herein, the anti-microbial agent is an additional fatty acid which exhibits an anti-microbial activity.

Any fatty acid that exhibits an anti-microbial activity is contemplated according to these embodiments, including saturated and unsaturated, short, medium and long fatty acids.

As shown in the Examples section that follows, it has been demonstrated that when fatty acids were incubated with a medium containing microorganisms, short to medium fatty acids exhibited an anti-microbial activity whereby longer fatty acids exhibited a lower or null anti-microbial activity.

According to some of any of the embodiments described herein, the additional fatty acid is of no more than 12, or no more than 10, carbon atoms in length.

In some embodiments, the additional fatty acid has a hydrocarbon chain (R in the above formula) comprising up to 11 carbon atoms in the backbone chain thereof. In some embodiments, the hydrocarbon comprises 11, 10, 9, 8, 7, 6 or 5 carbon atoms in its backbone chain.

In some embodiments, the additional fatty acid is liquid at room temperature.

In some embodiments, the additional fatty acid does not form a solid layer/film when spray-coated. According to these embodiments, an antimicrobial activity (e.g., reduction in a load of a pathogenic microorganism and/or inhibiting biofilm formation) can be imparted to the substrate by both a superhydrophobic matrix formed by the saturated fatty acid as described herein, which forms a layer upon spray-coating, and the anti-microbial additional fatty acid.

According to some of any of the embodiments described herein, the solution further comprises a coloring agent.

According to some of any of the embodiments described herein, the coloring agent is an edible coloring agent or an agent that is considered a food contact or GRAS substance as described herein.

According to any of the embodiments described herein, the process can further comprise heating the substrate after depositing the solution.

In some of the embodiments described herein, heating the substrate is effected at a temperature of 40 to 60° C. (e.g., 50° C.), and/or for a time period of from 12 to 48 hours (e.g., 24 hours).

The process of depositing a hydrophobic or superhydrophobic layer on at least a portion of a surface of a substrate can alternatively, or in addition, be performed by thermally evaporating onto the at least a portion of the surface a fatty acid, thereby depositing a hydrophobic or superhydrophobic layer on the at least a portion of the surface.

As discussed herein, another methodology underlying some embodiments of the present invention comprises thermal evaporation of fatty acids (e.g., saturated fatty acids as described herein) on at least a portion of the surface of a substrate.

As used herein, the terms "thermal evaporation" or "thermal deposition" and grammatical diversions thereof, refer to a method of thin layer deposition be means of vapor deposition. Typically, a material to be deposited is loaded into a heated container, which can be referred to as a crucible. The crucible may be heated by applying a current, or by any other heating means, and as the material in the crucible becomes hot it generates vapors which travel in straight lines until they strike a colder surface where they re-accumulate as a layer. Typically, in order to avoid decomposition of the material at elevated temperatures, thermal evaporation is performed under reduced pressure, in a close system. Further typically, the thickness of the layer is a function of the amount of the material that is evaporated and can therefore depend on the time and temperature of the thermal evaporation.

The expressions "thermally evaporated" or "thermally deposited" and grammatical diversions thereof, relate to a substance (e.g., fatty acid, as described herein) which was subjected to a thermal evaporation as described herein, and actually relates to the thin layer of the substance which is formed on a substrate's surface upon said thermal evaporation.

The fatty acid can be a saturated or unsaturated fatty acid, and in some embodiments it is a saturated fatty acid.

According to some of any of the embodiments described herein, upon thermally depositing the fatty acid, a substrate's surface features a static contact angle with water of at least 90, or at least 100, or at least 110°, preferably of at least 120, or at least 130, or at least 140°.

In some embodiments, fatty acid (e.g., fatty acid as described herein) is thermally evaporating onto said at least a portion of the surface by evaporation at a temperature that ranges from 40° C. to 700° C. Typically, thermal evaporation is effected at conditions (temperature and pressure) that allow efficient generation of vapors of the fatty acid. In some embodiments, thermally-evaporated fatty acid is deposited on a surface of a substrate by evaporation at a temperature that ranges from 100° C. to 400° C., under a reduced pressure of about $10^{-5}$-$10^{-6}$ mbars.

In some embodiments, thermally-evaporated fatty acid is deposited on a surface of a substrate by evaporation at a temperature that ranges from 100° C. to 300° C., under a reduced pressure of about $10^{-5}$-$10^{-6}$ mbars. In some embodiments, thermally-evaporated wax is deposited on a surface of a substrate by evaporation at a temperature that ranges from 150° C. to 250° C., under a reduced pressure of about $10^{-5}$-$10^{-6}$ mbars.

In some embodiments, fatty acid (e.g., fatty acid as described herein) is thermally evaporated onto the surface or a portion thereof by evaporation at a temperature of about 200° C., under a reduced pressure of about $10^{-5}$-$10^{-6}$ mbars.

The thermal evaporation deposition of a fatty acid as described herein allows obtaining desired superhydrophobic properties of the obtained coated surfaces. The superhydrophobic behavior of the surface results in high water CA and lower CAH values.

In some embodiments, thermally evaporating the fatty acid is effected as described hereinabove.

In some embodiments, the process further comprises, subsequent to thermally evaporating the fatty acid, maintaining the obtained composition of matter at a certain temperature for a certain time period. Such a step is also referred to as "aging". In some embodiments, the aging is made during a time period that ranges from 10 hours to several months.

In some embodiments, the process of thermally evaporating the fatty acid consists essentially of the thermal evaporation as described herein.

In some embodiments, the process of depositing the fatty acid is devoid of modifying the substrate's surface prior to thermally evaporating the fatty acid thereon.

Substrate and Article-of-Manufacturing Comprising Same:

A process/method as described herein provides a substrate featuring in at least a portion thereof a hydrophobic or superhydrophobic surface, as described herein, which is obtainable or prepared by a process as described herein in any of the respective embodiments.

A process/method as described herein provides a substrate having deposited on at least a portion of its surface a hydrophobic or superhydrophobic layer or film, as described herein, which is obtainable or prepared by a process as described herein in any of the respective embodiments.

Such a substrate can also be regarded as having a fatty acid-containing composition, or a fatty acid-containing layer or film, deposited on at least a portion of its surface.

Such a substrate can also be regarded as a composition-of-matter which comprises a substrate having a fatty acid-containing composition, or a fatty acid-containing layer or film, deposited on its surface or a portion thereof.

According to some of any of these embodiments, the deposited fatty acid-containing composition or layer or film is a spray-coated fatty acid-containing composition or layer or film, that is, a fatty acid-containing composition that has been deposited by spraying or spray-coating, as described herein in any of the respective embodiments and any combination thereof.

According to an aspect of some embodiments of the present invention there is provided a substrate having a fatty acid-containing composition deposited on at least a portion of a surface thereof, as described herein.

According to an aspect of some embodiments of the present invention there is provided a composition-of-matter that comprises a substrate having a fatty acid-containing composition deposited on at least a portion of a surface thereof, as described herein.

According to some of any of the embodiments described herein, the surface, or the at least a portion thereof, onto which the fatty acid-containing solution has been deposited, or which has a fatty acid-containing composition/layer/film deposited thereon, features at least one, at least two or all of the following: a static contact angle with water, as defined herein, of at least 140°; a contact angle hysteresis, as defined herein, of up to 10°; and a roughness, as defined herein of at least 0.2, or of at least 1 or of at least 2, micrometer, as these are described herein in any of the respective embodiments and any combination thereof.

Herein throughout, the expression "substrate having a fatty acid-containing composition or layer deposited on at least a portion of a surface thereof" is also referred to herein, for simplicity, as a coated substrate, a coated surface, a coated sample, a substrate or surface having a layer or film deposited thereon, and as varying combinations of the above expressions, and all of these expressions are referred to herein interchangeably.

According to some of any of the embodiments described herein, the fatty acid-containing composition is solid, and can comprise one, two or more layers, depending on the spray-coating parameters employed as described herein, the concentration of the fatty acid(s) in the solution and/or the organic solvent used.

According to some of any of the embodiments described herein, the fatty acid-containing composition has a thickness that ranges from about 1 to about 50 μm, or from 5 to 15 μm, including any intermediate values and subranges therebetween.

According to some of any of the embodiments described herein, the fatty acid-containing composition is a form of a film (a solid film), which has a thickness of no more than 50 μm, for example, of from 1 to 10 μm, including any intermediate values and subranges therebetween.

According to some of any of the embodiments described herein, upon depositing/applying the fatty acid-containing solution as described herein, the substrate's surface features a static contact angle, as defined herein, with water of at least 90, or at least 100, or at least 110°, preferably of at least 120, or at least 130, or at least 140°.

The fatty acid-containing layer/films/compositions described herein provide the substrates onto which they are deposited or applied with moisture protection, anti-microbial protection, and/or physical protection, and, when the substrate is an organic material such as a food or agricultural substance, with protection against volatile compounds' loss and gases exchange, which may cause browning discoloration and texture softening, and thereby preserve the food or agricultural substance.

According to some of any of the embodiments described herein, the substrate or substrate's surface comprises a material selected from a polymeric material, a plastic material, glass, wood, paper, concrete, a metallic material, a fiber, a ceramic material, a semi-conducting material, a natural organic material (e.g., a food or agricultural substance) and any combination thereof.

Substrate's surfaces usable according to any one of the embodiments of the present invention can be hard or soft, organic or inorganic surfaces, including, but not limited to, glass surfaces; porcelain surfaces; ceramic surfaces; polymeric surfaces such as, for example, plastic surfaces, rubbery surfaces, and surfaces comprising or made of polymers such as polypropylene (PP), polycarbonate (PC), high-density polyethylene (HDPE), unplasticized polyvinyl chloride (PVC), and fluoropolymers including but not limited to polytetrafluoroethylene (PTFE, Teflon®); metallic surfaces (e.g., gold surfaces) or can comprise or be made of silicon, organosilicon, stainless steel, gold, MICA, and polymers as described herein or include any combination of the above.

The substrate's surfaces as described herein can further be modified by various chemical and mechanical processes, including, for example, SAMs, PVD, lithography and plasma etching.

The substrate's surfaces as described herein can further be modified by depositing paints and/or coloring agents thereon. The paints can be oil-based or water-based.

The substrate's surface can be crystalline or non-crystalline and is typically utilized without further modification of its crystalline nature.

In some of the embodiments described herein, the fatty acid-containing composition/layer/films/coatings described herein are edible. Thus, any substrate or article or article-of-manufacturing which can benefit from the properties imparted by the deposited layer, and particularly from it being edible, is usable in the context of the present embodiments.

The term "agricultural substrate" as used herein refers to at least a portion of a surface, as described herein, of an agricultural substance, as described herein.

The terms "agricultural substance" as used herein relates to an agricultural product or crop, or a part thereof, grown, maintained, or otherwise produced for commercial purposes, including growing, maintaining or otherwise producing for sale or trade, for research or experimental purposes, or for use in part or their entirety in another location. Herein, an agricultural substrate or an agricultural substance encompasses any plant matter that is cultivated, bred, raised, grown, developed, maintained, and/or stored, as part of an agricultural process or agricultural type of process. In a non-limiting manner, an agricultural substrate is also to be understood as generally being any plant matter or animal matter that is cultivated, bred, raised, grown, developed, maintained, and/or stored, as part of a process involving and/or relating to, agronomy (i.e., scientific agriculture), horticulture (i.e., art and science of growing flowers, fruits, vegetables, and shrubs, especially in gardens or orchards), botany (i.e., art and science of plants), zoology, marine biology, among other fields, which are either known, or may be considered, as being related or connected to the field of agriculture.

In some embodiments the agricultural substrate or substance is a plant matter. Plant matter is to be understood as generally being any number and type of plant entity, structure, substance, or material, which is in some stage of being cultivated, bred, raised, grown, developed, maintained, and/or stored, as well as to any number and type of plant entity, structure, substance, or material, which may be, or has been, harvested or cut. Harvested or cut plant matter is to be understood as generally being plant matter which has been entirely or wholly separated, detached, or removed, from the soil or earth hosting the plant matter. Such separating, detaching, or removing, of the plant matter is performed by pulling and/or cutting the plant matter out of, or out from, the soil or earth hosting the plant matter, at the point or location of cultivating, breeding, raising, growing, or developing, of the plant matter, such that the harvested plant matter is no longer considered plant matter that is actively cultivated, bred, raised, grown, or developed. In a non-limiting manner, exemplary types of plant matter which are particularly relevant to the field and art of the present invention are crops, plants, trees, bushes, shrubs, vines, flowers, and weeds. Exemplary types of plant matter which are especially relevant to the field and art of the present invention are commercial grain, vegetable, or fruit, types of crops or plants, and, flowers.

Exemplary agricultural plant includes, but is not limited to, grains; fruits and vegetables; wood fiber or timber products; flowering and foliage plants and trees; seedlings and transplants; and turf grass produced for sod.

Further exemplary agricultural plant substrates include, but are not limited to, i) corn, soybean, cotton, canola, sugar beet, alfalfa, sugarcane, rice, and wheat; ii) vegetable plants including, but not limited to, tomato, sweet pepper, hot pepper, melon, watermelon, cucumber, eggplant, cauliflower, broccoli, lettuce, spinach, onion, peas, carrots, sweet corn, Chinese cabbage, leek, fennel, pumpkin, squash or gourd, radish, Brussels sprouts, tomatillo, garden beans, dry beans, or okra; iii) culinary plants including, but not limited to, basil, parsley, coffee, or tea; iv) fruit plants including, but not limited to, apple, pear, cherry, peach, plum, apricot, banana, plantain, table grape, wine grape, citrus, avocado, mango, or berry; v) a tree grown for ornamental or commercial use, including, but not limited to, a fruit or nut tree; or vi) an ornamental plant (e.g., an ornamental flowering plant or shrub or turf grass). The methods and compositions provided herein can also be applied to plants produced by a cutting, cloning, or grafting process (i.e., a plant not grown from a seed) including fruit trees and plants that include, but are not limited to, citrus, apples, avocados, tomatoes, eggplant, cucumber, melons, watermelons, and grapes, as well as various ornamental plants.

In some embodiments, the term "plant" as used herein encompasses whole plants, a grafted plant, ancestors and progeny of the plants and plant parts, including seeds, shoots, stems, roots (including tubers), rootstock, scion, leaves.

Plants include, for example, algae, bryophytes, tracheophytes, and angiosperms. Angiosperms include, for example, flowering plants, cycads, *Ginkgo biloba*, and conifers. Plants include seedlings, mature plants, trees and turf. Plant tissues can include, for example, roots, leaves, stems, flowers, seeds, and fruits.

Plants according to the present embodiments include all plants which belong to the superfamily Viridiplantee, in particular monocotyledonous and dicotyledonous plants including a fodder or forage legume, ornamental plant, food crop, tree, or shrub selected from the list comprising Acacia spp., Acer spp., *Actinidia* spp., *Aesculus* spp., *Agathis australis, Albizia amara, Alsophila tricolor, Andropogon* spp., *Arachis* spp, *Areca catechu, Astelia fragrans, Astragalus cicer, Baikiaea plurijuga, Betula* spp., *Brassica* spp., *Bruguiera gymnorrhiza, Burkea africana, Butea frondosa, Cadaba farinosa, Calliandra* spp, *Camellia sinensis, Canna indica, Capsicum* spp., *Cassia* spp., *Centroema pubescens, Chacoomeles* spp., *Cinnamomum cassia, Coffea arabica, Colophospermum mopane, Coronillia varia, Cotoneaster serotina, Crataegus* spp., *Cucumis* spp., *Cupressus* spp., *Cyathea dealbata, Cydonia oblonga, Cryptomeria japonica, Cymbopogon* spp., *Cynthea dealbata, Cydonia oblonga, Dalbergia monetaria, Davallia divaricata, Desmodium* spp., *Dicksonia squarosa, Dibeteropogon amplectens, Dioclea* spp, *Dolichos* spp., *Dorycnium rectum, Echinochloa pyramidalis, Ehraffia* spp., *Eleusine coracana, Eragrestis* spp., *Erythrina* spp., *Eucalypfus* spp., *Euclea schimperi, Eulalia vi/losa, Pagopyrum* spp., *Feijoa sellowlana, Fragaria* spp., *Flemingia* spp, *Freycinetia banksli, Geranium thunbergii, GinAgo biloba, Glycine javanica, Gliricidia* spp, *Gossypium hirsutum, Grevillea* spp., *Guibourtia coleosperma, Hedysarum* spp., *Hemaffhia altissima, Heteropogon contoffus, Hordeum vulgare, Hyparrhenia rufa, Hypericum erectum, Hypeffhelia dissolute, Indigo incamata, Iris* spp., *Leptarrhena pyrolifolia, Lespediza* spp., *Lettuca* spp., *Leucaena leucocephala, Loudetia simplex, Lotonus bainesli, Lotus* spp., *Macrotyloma axillare, Malus* spp., *Manihot esculenta, Medicago saliva, Metasequoia glyptostroboides, Musa sapientum, Nicotianum* spp., *Onobrychis* spp., *Ornithopus* spp., *Oryza* spp., *Peltophorum africanum, Pennisetum* spp., *Persea gratissima, Petunia* spp., *Phaseolus* spp., *Phoenix canariensis, Phormium cookianum, Photinia* spp., *Picea glauca, Pinus* spp., *Pisum sativam, Podocarpus totara, Pogonarthria fleckii, Pogonaffhria squarrosa, Populus* spp., Prosopis *cineraria, Pseudotsuga menziesii, Pterolobium stellatum, Pyrus communis, Quercus* spp., *Rhaphiolepsis umbellata, Rhopalostylis sapida, Rhus natalensis, Ribes grossularia, Ribes* spp., *Robinia pseudoacacia, Rosa* spp., *Rubus* spp., *Salix* spp., *Schyzachyrium sanguineum, Sciadopitys vefficillata, Sequoia sempervirens, Sequoiadendron giganteum, Sorghum bicolor, Spinacia* spp., *Sporobolus fimbriatus, Stiburus alopecuroides, Stylosanthos humilis, Tadehagi* spp, *Taxodium distichum, Themeda triandra, Trifolium* spp., *Triticum* spp., *Tsuga heterophylla, Vaccinium* spp., *Vicia* spp., *Vitis vinifera, Watsonia pyramidata, Zantedeschia aethiopica, Zea mays*, amaranth, artichoke, asparagus, broccoli, Brussels sprouts, cabbage, canola, carrot, cauliflower, celery, collard greens, flax, kale, lentil, oilseed rape, okra, onion, potato, rice, soybean, straw, sugar beet, sugar cane, sunflower, tomato, squash tea, trees.

In some of any of the embodiments described herein, an agricultural substrate includes a plant's leaf, leaves, foliage, petal, roots, stems, flower and/or fruit.

The term "food substance" as used herein includes any un-packaged or packaged food products. The term "food product" or "food substance" as used herein refers to a substance that is sold for ingestion or chewing by humans and is consumed for its taste or nutritional value.

In some of any of the embodiments described herein, the substrate or the article-of-manufacturing is a food contact substance.

The phrase "food contact substance" or FCS, is used herein to describe substances that are generally safe for human consumption by virtue of being generally recognized as safe (GARS) or by passing standard safety tests, and thus qualify for use as a component of materials used in manufacturing, packing, packaging, transporting, or holding food, in the same manner it is meant in the guideline and regulation of worldwide food administration authorities, such as, for example, the U.S. Food and Drug Administration (FDA), Center for Food Safety and Applied Nutrition (CFSAN), the Office of food Additive Safety.

For example, in the U.S.A., U.S. Federal Food, Drug, and Cosmetic (FD&C) Act, Section 409, defines an FCS as any substance that is intended for use as a component of materials used in manufacturing, packing, packaging, transporting, or holding food if such use of the substance is not intended to have any technical effect in such food. According to the U.S. FD&C Act, there is a hierarchy from food contact substance (FCS) through food contact material (FCM) to food contact article (FCA), wherein a food contact substance is a single substance, such as a polymer or an antioxidant in a polymer. As a substance, it is said to be reasonably pure; a food contact material (FCM) is made with the FCS and other optional substances; and a food contact article is the finished film, bag, wrap, container, bottle, dough hook, tray, or any other object of manufacture that is formed out of the FCM.

The phrase "generally recognized as safe" or GRAS, as used herein, is meant in the same manner which is defined, for example, under sections 201(s) and 409 of the U.S. FD&C Act. The U.S. law states that any substance that intentionally contacts food or added to food is a food additive, that is subject to premarket review and approval by FDA, unless the substance is generally recognized, among qualified experts, as having been adequately shown to be safe under the conditions of its intended use, or unless the use of the substance is otherwise excluded from the definition of a food additive. GRAS substances are distinguished from food additives by the type of information that supports the GRAS determination, that it is publicly available and generally accepted by the scientific community, but should be the same quantity and quality of information that would support the safety of a food additive.

Since the qualification to an FCS or GRAS category can be obtained through a process of applying, testing and qualifying to the requirements of the various official food and drug authorities, the present embodiments are meant to encompass all relevant substances and their derivatives which are to become FCSs and GRAS in the future, as well as those which already qualify as FCSs and GRAS.

According to some of any of the embodiments described herein, the substrate is or forms a part of an article-of-manufacturing that can benefit from the hydrophobic or superhydrophobic nature of the coated substrate. Exemplary such articles-of-manufacturing include, but are not limited to, a medical device, an electronic device, a component of an air-condition system or device, a food packaging material, a food contact substance as defined herein, a food storage material, a food product or substance, a food contact substance, a cosmetic packaging material, an agricultural substance or substrate as described herein, an agricultural substrate packaging and/or storage material, a vehicle component, a component of a cooling system or device, a device or system in a public store or institution, a device or system or component of a public transportation vehicle or station, and construction parts of e.g., public store or institution, including, for example, walls, ceilings, doors and window handles.

The term "cosmetic packaging" as used herein refers to cosmetic containers (i.e., primary packaging) and secondary packaging of fragrances and cosmetic products.

The term "agricultural substrate packaging" as used herein includes agricultural packaging, and refers to the technology of enclosing or protecting or preserving agricultural products for distribution, storage, sale, and use.

The term "medicines packaging" as used herein includes any pharmaceutical or drug packaging. It refers to the packages and the packaging processes for pharmaceutical preparations, and involves all of the packaging processes from production through drug distribution channels to the end consumer.

The term "food packaging" as used herein includes any food or beverage packaging, and refers to a product that is used for food or drink offered for retail sale or use, and is composed of plastic or paper with a plastic coating or additive. Exemplary food packaging product includes, but is not limited to, cups, containers, foodservice ware and utensils (including straws and lids), and also encompasses machines and containers usable during the production, storage and transportation of edible products.

According to an aspect of some embodiments of the present invention there are provided articles-of-manufacturing which comprise any one of the substrates or compositions of matter as described herein (having spray-coated fatty acid-containing composition/layer/film deposited on at least a portion of a substrate's surface).

In some embodiments, there is provided an article-of-manufacturing which comprises a substrate having deposited on a surface (or a portion of a surface) thereof a spray-coated fatty acid-containing composition/layer/film as described herein.

In some embodiments, there is provided an article-of-manufacturing which comprises a substrate having deposited on a surface (or a portion of a surface) thereof spray-coated fatty acid-containing composition as described herein, wherein the surface is characterized by roughness and/or static liquid contact angle and/or porosity as described herein in any of the respective embodiments and any combination thereof.

In some embodiments, there is provided an article of manufacturing which is prepared by spray coating a mixture of a fatty acid and an organic solvent as described herein in any of the respective embodiments and any combination thereof (e.g., a fatty acid-containing solution as described herein) onto a surface or a portion of the surface thereof.

Any article that may benefit from the superhydrophobicity of the surfaces described herein is contemplated.

According to some of any of these embodiments, the substrate or composition-of-matter are characterized by hydrophobicity or superhydrophobicity, roughness and/or porosity, as described herein.

In some embodiments, substrates and/or articles and/or article of manufacturing which are or which are in contact with edible substances are usable in the context of the present embodiments. These include, for example, food and agricultural substances, food contact substances as described herein, packaging materials thereof, storage containers/shelves/devices/systems thereof, vehicles usable for transporting same, and parts included in any of the above. For example, walls, handles, shelves, doors, windows of a vehicle used to transport food and/or agricultural substances; walls, handles, doors, shelves, windows of a cooling system or device used to store food and/or agricultural substances; walls, handles, doors, shelves, windows of a supermarket or grocery store selling food and/or agricultural substances.

The term "storage containers" as used herein refers to vessels or tanks, including mix equipment, used to hold finishing or cleaning materials.

Exemplary articles-of-manufacturing include, but are not limited to, implantable medical devices such as, but are not limited to, pacemakers, heart valves, replacement joints, catheters, catheter access ports, dialysis tubing, gastric bands, shunts, screw plates, artificial spinal disc replacements, internal implantable defibrillators, cardiac resynchronization therapy devices, implantable cardiac monitors, mitral valve ring repair devices, left ventricular assist devices (LVADs), artificial hearts, implantable infusion pumps, implantable insulin pumps, stents, implantable neurostimulators, maxillofacial implants, dental implants, and the like.

Exemplary articles-of-manufacturing include packages or containers, for example, food packages and containers, beverage packages and containers, medical device packages, agricultural packages and containers (of agrochemicals or agricultural substrates), blood sample or other biological sample packages and containers, and any other packages or containers of various articles.

Exemplary food packages include packages of dairy products and/or containers for storage or transportation of dairy products.

Other exemplary articles-of-manufacturing include articles used during manufacturing, storage and/or transportation of food, beverage, agricultural, medical and/or cosmetic products such as, but not limited to, containers, storage tanks, tube walls, gaskets, rubber seals, stainless steel coupons, piping systems, filling machine, silo tanks, heat exchangers, postpasteurization equipment, pumps, valves, separators, and spray devices.

In some embodiments, the article-of-manufacturing is an energy harvesting device, for example, a microelectronic device, a microelectromechanic device, a photovoltaic device and the like.

In some embodiments, the article-of-manufacturing is a microfluidic device, for example, micropumps or micro valves and the like.

In some embodiments, the article-of-manufacturing includes a sealing part, for example, O rings, and the like.

In some embodiments, the article-of-manufacturing is, for example, article having a corrosivable surface.

In some embodiments, the article-of-manufacturing is an agricultural device.

In some embodiments, the article-of-manufacturing is made of textile, for example, tough cottons.

In some embodiments, the article-of-manufacturing is a fuel transportation device.

In some embodiments, the article-of-manufacturing is a construction element, such as, but not limited to, paints, walls, windows, door handles, and the like.

In some embodiments, the article-of-manufacturing is an element in water irrigation or treatment systems (such as for containing and/or transporting and/or treating aqueous media or water), devices, containers, filters, tubes, solutions and gases and the likes.

In some embodiments, the article-of-manufacturing is an element is organic waste treatment systems (such as for containing and/or disposing and/or transporting and/or treating organic waste), devices, containers, filters, tubes, solutions and gases and the likes.

In some embodiments, the article-of-manufacturing is an element (e.g., door, handle, window, wall, cooling device or system, air-conditioning device or system, storage container or shelf, and any other element) in a public construction, public store or public institution, including supermarkets, religious institutions, medical institutions (e.g., hospitals), and the like.

Substrates usable in the context of these embodiments of the present invention include any of the substrates described hereinabove.

Composition-of-matters usable in the context of these embodiments include any of the compositions of matter described hereinabove.

Articles-of-manufacturing usable in the context of these embodiments include any of the articles of manufacturing described hereinabove.

According to an aspect of some embodiments of the present invention, there is provided a composition-of-matter or a substrate as described in any one of the present embodiments, which is identified for use, or is for use, or is usable, in the preparation of an article-of-manufacturing containing the substrate of the composition of matter, as described herein.

Preparing articles-of-manufacturing as described herein, which comprise substrates or compositions-of-matter as described herein, having a fatty acid-containing composition deposited thereon, can be performed by preparing the substrate (e.g., by spray-coating as described herein) and integrating it with the article-of-manufacturing, or by spray-coating directly on surfaces and/or portions of the article-of-manufacturing where desirable.

Kit:

According to an aspect of some embodiments of the present invention, there is provided a kit comprising a container, a fatty acid and an organic solvent, and means for spraying, as described herein in any of the respective embodiments and any combination thereof, a solution of the fatty acid and the organic solvent, as described herein in any of the respective embodiments and any combination thereof, from the container.

The kit may further comprise an additive as described herein, for example, an anti-microbial agent as described herein in any of the respective embodiments (e.g., an additional fatty acid).

The kit can be identified as usable for depositing a hydrophobic or superhydrophobic layer on a surface of a substrate and/or for reducing a load of a pathogenic microorganism on and/or in the substrate and/or for inhibiting, reducing or preventing biofilm formation, as described herein in any of the respective embodiments.

The fatty acid, the organic solvent and an additive, if present, can each be packaged individually in the kit. Alternatively, the fatty acid and the additive can be packaged together and the organic solvent is packaged separately. Further alternatively, a solution containing the fatty acid and the organic solvent is packaged in the kit, and an additive, if present, is packaged individually. Further alternatively, a solution containing the fatty acid and the organic solvent and an additive, if present, is packaged in the kit.

Alternatively, the kit does not comprise an organic solvent but comprises instructions to mix the fatty acid or the fatty acid and the additive with an organic solvent prior to use.

The fatty acid or the fatty acid and the additive can be included in the container or packaged individually within the kit.

Uses:

According to some of any of the embodiments described herein, a process as described herein in any of the respective embodiments and any combination thereof is for reducing or preventing formation of a biofilm on a substrate or in/on an article-of-manufacturing comprising the substrate, such as described herein.

In some embodiments, a composition-of-matter or a substrate or a kit as described herein is identified for use, is for use, or is usable, in preparing articles-of-manufacturing which are characterized as capable of reducing, inhibiting and/or retarding biofilm formation, as described herein, or in which reducing, inhibiting and/or retarding biofilm formation is desirable.

According to some of any of the embodiments described herein, there is provided a process/method of reducing, inhibiting and/or retarding biofilm formation on a surface of a substrate or of an article-of-manufacturing comprising the substrate, as described herein, which is effected by applying/depositing on the surface or a portion thereof, as described herein, a fatty acid-containing solution as described herein in any of the respective embodiments and any combination thereof.

According to some of any of the embodiments described herein, there is provided a process/method of preparing an article-of-manufacturing is which reducing, inhibiting and/or retarding biofilm formation is desirable, as described herein in any of the respective embodiments, which is effected by applying/depositing on the surface or a portion thereof, as described herein, a fatty acid-containing solution as described herein in any of the respective embodiments and any combination thereof.

According to embodiments of the present invention, the applying/depositing the solution is by spraying the solution or by spray-coating, as described herein in any of the respective embodiments and any combination thereof.

The term "biofilm", as used herein, refers to an aggregate of living cells which are stuck to each other and/or immobilized onto a surface as colonies. The cells are frequently embedded within a self-secreted matrix of extracellular polymeric substance (EPS), also referred to as "slime", which is a polymeric sticky mixture of nucleic acids, proteins and polysaccharides.

In the context of the present embodiments, the living cells forming a biofilm can be cells of a unicellular microorganism (prokaryotes, archaea, bacteria, eukaryotes, protists, fungi, algae, euglena, protozoan, dinoflagellates, apicomplexa, trypanosomes, amoebae and the likes), or cells of multicellular organisms in which case the biofilm can be regarded as a colony of cells (like in the case of the unicellular organisms) or as a lower form of a tissue.

In the context of the present embodiments, the cells are of microorganism origins, and the biofilm is a biofilm of microorganisms, such as bacteria and fungi. The cells of a microorganism growing in a biofilm are physiologically distinct from cells in the "planktonic form" of the same organism, which by contrast, are single-cells that may float or swim in a liquid medium. Biofilms can go through several life-cycle steps which include initial attachment, irreversible attachment, one or more maturation stages, and dispersion.

The phrases "anti-biofilm formation (ABF) activity" refers to the capacity of a substance to effect the prevention of formation of a biofilm of bacterial, fungal and/or other cells; and/or to effect a reduction in the rate of buildup of a biofilm of bacterial, fungal and/or other cells, on a surface of a substrate.

In some embodiments, the biofilm is formed of bacterial cells (or from a bacterium).

In some embodiments, a biofilm is formed of bacterial cells of bacteria selected from the group consisting of all Gram-positive and Gram-negative bacteria.

In some embodiments, the Gram-negative biofilm-forming bacteria may be selected from the group of milk-processing environment species such as, but not limited to, *Proteus, Enterobacter, Citrobacter, Shigella, Escherichia, Edwardsiella, Aeromonas, Plesiomonas, Moraxella, Alcaligenes*, and *Pseudomonas.*

In some embodiments, the Gram-positive biofilm-forming bacteria may be selected from the group of milk-processing environment species consisting of *Staphylococcus, Bacillus, Listeria*, and lactic acid bacteria such as, but not limited to, *Streptococcus, Leuconostoc*, and *Pediococcus*.

In exemplary embodiments, a biofilm is formed of *Escherichia coli* bacterial cells.

In exemplary embodiments, a biofilm is formed of *Listeria innocua* bacterial cells.

In some embodiments, inhibiting, reducing and/or retarding a formation of a biofilm as described herein is reflected by reducing biofilm formation on the substrate's surface by at least 20%, at least 30%, at least 40%, at least 50%, at least 60%, at least 70%, at least 80%, at least 90%, including any value therebetween, compared to the same substrate which does not have spray-coated fatty acid deposited on a surface thereof.

In some embodiments, inhibiting, reducing and/or retarding the formation of a biofilm in or on a substrate or an article containing the substrate, is effected by spray depositing onto a surface of the substrate an anti-fouling effective amount of a fatty acid-containing composition as described herein, using a process as described herein.

As used herein, "an anti-fouling effective amount" is defined as the amount which is sufficient to inhibit, retard and/or reduce the formation of a biofilm as described herein. Assays for determining an anti-fouling effective amount are known is the art and are contemplated herein.

The prevention or reducing of forming a biofilm assumes that the biofilm has not yet been formed, and hence the presence of the fatty acid is required also in cases where no biofilm is present or detected.

As used herein, the term "preventing" in the context of the formation of a biofilm, indicates that the formation of a biofilm is essentially nullified or is reduced by at least 20%, at least 30%, at least 40%, at least 50%, at least 60%, at least 70%, at least 80%, at least 90%, including any value therebetween, of the appearance of the biofilm in a comparable situation lacking the presence of the spray-coated fatty acid. Alternatively, preventing means a reduction to at least 15%, 10% or 5% of the appearance of the biofilm in a comparable situation lacking the presence of the spray-coated fatty acid. Methods for determining a level of appearance of a biofilm are known in the art.

According to some of any of the embodiments described herein, a process as described herein is for reducing a load of a pathogenic organism on the substrate or in/on an article-of-manufacturing comprising the substrate.

According to some of any of the embodiments described herein, a process as described herein is for reducing a load of a pathogenic organism on the substrate or in/on an article-of-manufacturing comprising the substrate.

The microorganism can be, for example, a prokaryote, archae, a bacterium, an eukaryote, a protist, a fungus, algae, euglena, a protozon, a dinoflagellate, apicomplexa, trypanosomes, amoeba and the likes, or a portion of the microorganism.

By "portion of the microorganism" it is meant eggs, spores, an organ, a tissue (e.g., epidermis) or cells of the organism, or such that derived from the organism.

In some embodiments, the microorganism is a bacterium or a fungus.

Exemplary fungi which are considered unbeneficial include, but are not limited to, *Candida, Aspergillus, Blastomyces, Cryptococcus, Histoplasma, Pneumocystis*, and *Stachybotrys*. Pathogenic species include, but are not limited to, *Candida albicans, Candida stellatoidea, Candida tropicalis, Candida pseudotropicalis, Candida krusei, Candida parapsilosis, Candida guilliermondii, Aspergillus fumigatus, Aspergillus flavus, Aspergillus clavatus, Aspergillus fumigatus, Papiliotrema laurentii, Naganishia albida, Cryptococcus neoformans, Cryptococcus gattii, Histoplasma capsulatum, Pneumocystis jirovecii* (*Pneumocystis carinii*), *Stachybotrys chartarum, Piedraia hortae, Fonsecaea pedrosoi, Diheterospora zeaspora* (*Rotiferophthora zeaspora*), *Coccidioides immitis, Coccidioides posadasii, Paracoccidoides brasiliensis, Paracoccidioides lutzii, Sporothrix schenckii, Talaromyces marneffei* (*Penicillium marneffei*), *Penicillium digitatum, Blastomyces dermatitidis*, and *Rhizopus zygomycosis.*

In some embodiments, the microorganism is a fungus, and in some embodiments, it is a plant-infecting fungus.

Exemplary fungi which are considered pathogenic for plants include, but are not limited to, Ascomycota (e.g., *Pestalotiopsis theae, Pyricularia oryzae, Botrytis cinerea*), Basidiomycota (e.g. *Ustilago tritici, Ustilago maydis, Puccinia graminis tritici, Puccinia recondite, Puccinia striiformis, Phakopsora pachyrhizi, Phakopsora meibomiae*), and heterokont (e.g., *Phytophthora infestans, Phytophthora colocasiae*) fungi. Additional species are described in Crous et al (Phytopathology, 2021, 111, 1500-1508), and in Doehlemann et al. (*Microbiology Spectrum*, Vol. 5, No. 1, 2017).

The bacterium can be a Gram-negative bacterium or a Gram-positive bacterium, as described herein.

By "reducing a load" it is meant reducing the amount of a living pathogenic microorganism, including, inhibiting proliferation, inhibiting growth, and/or killing the pathogenic microorganism.

According to some of any of the embodiments described herein, the process/method as described herein in any of the embodiments, are for treating an agricultural substance, e.g., a plant or a plant matter, as described herein in any of the respective embodiments and any combination thereof, by reducing a load of a pathogenic microorganism in the agricultural substance (e.g., plant or plant matter) and/or by reducing or preventing formation of a biofilm on or in the agricultural substance (e.g., plant or plant matter as described herein).

According to an aspect of some embodiments of the present invention there is provided a process of reducing a load of a pathogenic microorganism on and/or in an agricultural substance as described herein, which is effected by spraying onto at least a portion of the agricultural substance a fatty acid-containing solution as described herein in any of the respective embodiments and any combination thereof.

In some of any of the embodiments described herein, the fatty acid-containing solution is deposited (sprayed) onto a plant's leaf, leaves, foliage, petals, roots, stems, flowers or fruits.

In some of any of the embodiments described herein, spraying the agricultural substrate with a fatty acid-containing solution as described herein comprises spraying a plant's root with the fatty acid-containing solution. Such contacting can be effected by hydroponic irrigation, by adding the solution to the aqueous solution used for hydroponic irrigation. Alternatively, the fatty acid-containing solution is applied to the soil surrounding the plant's root, by introducing the solution to an irrigation system or by integrating the solution with an irrigation system.

In some embodiments, the fatty acid-containing solution is applied, depending on the concentration, to affect microbial growth in perennial cultures such as: decorative tree plantings, fruit orchards, vineyards, citrus groves, nut orchards, banana plantations, coffee plantations, tea plantations, rubber plantations, oil palm plantations, cocoa plantations, soft fruit plantings and hop fields, and for the selective combating of weeds in annual cultures.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

The term "treating" refers to inhibiting, preventing or arresting the development of a pathology (disease, disorder or condition) and/or causing the reduction, remission, or regression of a pathology. Those of skill in the art will understand that various methodologies and assays can be used to assess the development of a pathology, and similarly, various methodologies and assays may be used to assess the reduction, remission or regression of a pathology.

As used herein, the term "preventing" refers to keeping a disease, disorder or condition from occurring in a subject who may be at risk for the disease, but has not yet been diagnosed as having the disease.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Experimental Methods

Materials:

Organic solvents were obtained from known vendors unless otherwise indicated.

Saturated fatty acids (SFAs): Lauric acid (99%, Acros Organics); Myristic acid (99%, Acros Organics); Palmitic acid (98%, Acros Organics); Stearic acid (97%, Merck); Arachidic acid (99%, Sigma-Aldrich); Behenic acid (96%, AA Blocks); Lignoceric acid (96%, AA Blocks); Cerotic acid (95%, AA Blocks); Caprylic acid (99%, Acros Organics); and sorbic acid (99%, Thermo Scientific).

Sample Preparation:

Thermal deposition of fatty acids on glass substrates was performed using Moorfield Minilab coating system. The process was performed in a vacuum chamber at a pressure of about $2\times10^{-9}$ [bar] by heating a crucible, which contains the coating material. Gradually increasing electrical current was applied in order to heat the crucible. The substrates were placed onto a rotating holder about 10 cm above the crucible. After deposition the samples were stored in a freezer (−25° C.). An amount of 125±1 mg of a fatty acid was used for the deposition, unless otherwise mentioned.

Spray coating was performed using commercially available dye spray gun, connected to an air compressor. The same system setup was used to perform the deposition of fatty acids. The respective materials and solvents used are described hereinbelow. After the coatings were deposited, the samples were left overnight in vacuum oven at room temperature (RT) in order to remove any solvent residuals.

Thermal treatments of the coatings (to provide thermally treated fatty acid coatings) were performed using a Jeio Tech OV-11 oven at 50° C. The oven was pre-heated and samples were inserted once the temperature stabilized. The samples were heated for 24 hours, cooled to room temperature, and stored in the freezer (−25° C.).

Characterization: Resulted coatings were characterized in order to investigate their physical properties, crystallographic properties, structural and thermal stability, as follows.

Morphology of the coatings was studied using high-resolution scanning electron microscope (HR-SEM) Zeiss Ultra Plus FEG-SEM or Zeiss LSM 510 META. Prior to imaging, a conductive carbon coating was deposited onto the surface of the samples. The same technique was used to image the cross-sections of the coatings: Prior to the coating deposition, a scratch was implemented on the glass surface. Following deposition, samples were broken along the scratch and the exposed cross-sectional surface was examined using HR-SEM.

Wetting properties of the coatings were characterized by CA and CAH measurements, which were performed using an Attension Theta Lite tensiometer and high-purity water or ethylene glycol (99.5%, Merck, Germany) droplets of 7 μL volume.

Roughness and coating thickness were measured using a dynamic confocal microscope (Leica DCM3D); data processing was performed using SensoMap Turbo software. The coating thickness was calculated as the difference in height between the lower and upper levels of a confocal profile measured after a scratch implementation on the coating using a 25 G needle.

Structural characterization was performed using XRD measurements in a parallel beam 0-mode using Cu anode sealed tube (Rigaku, SmartLab, X-ray Diffractometer). The preferred orientation degree, η, was calculated according to the March-Dollase method and its extension [Dollase, J. Appl. Crystallogr. (1986); and Zolotoyabko, J. Appl. Crystallogr. (2009)]:

$$\eta = \left[\frac{(1-r)^3}{1-r^3}\right]^{1/2} \cdot 100\%$$

Parameter r is dependent on the angle, a, between the two compared planes, the preferred orientation plane and the reference plane and can be calculated as follows:

$$r = \left[\frac{\sin^2\alpha}{\left(\frac{k_{sample}}{k_{powder}}\right)^{\frac{2}{3}} - \cos^2\alpha}\right]^{1/3}$$

wherein k is the ratio between intensities of the preferred orientation plane and the reference plane (calculated for the sample and randomly oriented powder).

Differential scanning calorimetry (DSC): DSC was used to study the origin of the additional XRD diffraction peaks. Fatty acids were detached from the glass substrate of spray-coated samples and were examined using DSC (LabSys 131 (SETARAM)). A cyclic measurement was performed by heating the powder from 20° C. to 150° C. followed by cooling to 20° C.

Bacterial Cultures:

Gram-negative *Escherichia coli* (*E. coli*) ATCC 8739 were cultured (grown up to a concentration of $10^8$ CFU/ml) in Luria Broth (LB) medium containing 10 g $L^{-1}$ Bacto Tryptone (BD, USA), 5 gram $L^{-1}$ Bacto yeast extract (BD, USA) and 5 gram $L^{-1}$ sodium chloride (BioLab, Israel). LB agar plates for culturing were prepared by adding 18 gram $L^{-1}$ Bacto agar (BD, USA) to the LB medium.

Gram-positive *Listeria innocua* (*L. innocua*) ATCC 33090 was cultured in Brain Herat (BH) medium containing 37 gram $L^{-1}$ BH Infusion (BD, USA). BH agar plates for culturing were prepared by adding 18 gram $L^{-1}$ Bacto agar to the BH medium.

The bacteria were cultured in the appropriate agar plate and stored at 4° C. Next, one bacteria colony was incubated overnight in 4 mL liquid medium (LB or BH) at 37° C. under agitation (150 rpm) until the bacteria reached a stationary phase (about $10^9$ CFU $mL^{-1}$). Then, the bacterial suspensions were diluted by 1:100 in liquid medium for further experiments.

Characterization of bacterial adhesion onto saturated fatty acid (SFA) spray-coated surface: SFA spray-coated surfaces were prepared as described hereinabove using 10 mm round cover glass for slides as a substrate. The coated samples were UV-sterilized prior to use.

Bacteria viability was studied by using a LIVE/DEAD® BacLight™ viability kit, where a 0.3% solution concentration (0.15% concentration of each reagent) was used.

Subsequently, for three-dimensional image projection of the samples a confocal laser scanning microscope (CLSM), Zeiss LSM 510 META was used. Combinations of 488 nm and 561 nm laser lines were used for the excitation of live bacteria and dead bacteria, respectively. Quantification of adhered live/dead bacteria on the surface based on CLSM fluorescent images was performed using Spots analysis in Imaris 9.3.1 software. The values were normalized per depth unit to neutralize thickness difference of the coatings. Due to roughness of the sprayed samples, the algorithm counts all the bacteria in the slice, even the non-adhered (thus representing the worst case).

HR-SEM micrographs were obtained after bacteria were fixed on the surfaces using a glutaraldehyde solution (2% in 0.1 M normal saline) followed by dehydration through an ethanol series. Then, the samples were dried under vacuum overnight and sputtered with a conductive carbon coating.

Antimicrobial studies: The antimicrobial properties of fatty acid powders were evaluated by in liquid medium via the drop-plate method. One bacteria colony (*E. coli* or *L. innocua*) was incubated overnight in 4 mL Nutrient Broth (NB) liquid medium (Sigma Aldrich, Israel) at 37° C. under agitation (150 rpm) until the bacteria reached a stationary phase (about $10^9$ CFU/mL). Then, the overnight bacteria culture was diluted in fresh NB medium (about $10^7$ CFU/mL) and incubated for an additional 2 hours to achieve a logarithmic culture. Next, the logarithmic culture was diluted to $10^4$ CFU $mL^{-1}$ in 1:100 NB medium.

1 mL of the diluted bacterial suspension was incubated with 50 milligram of different SFA powders at 37° C. for 24 hours in 24-well-plates under agitation (100 rpm). The cultures were decimally diluted and 10 μL drops were transferred onto NB solid agar substrate. The colonies were counted after 24 hours incubation at 37° C.

Anti-fungal studies: *Botrytis cinerea* (*B. cinerea*) isolate B05.10 was collected from *Vitis vinifera*.

Example 1

Thermally Deposited Fatty Acid Solutions

Fatty acids (FAs) were used as non-toxic components for superhydrophobic coatings. The previously examined thermal evaporation method (WO 2014/091489) was used to form superhydrophobic coatings on various types of surfaces using various fatty acids.

Selected SFAs were thermally deposited on glass microscope slides (see Materials and Experimental Methods section), and the morphology of the resulting fatty acid coatings was analyzed using HR-SEM (data not shown).

While medium fatty acid coatings (including palmitic, stearic, and arachidic acids) provided well-defined and edged crystals, long fatty acid coatings (behenic, lignoceric, and cerotic acids) comprised hierarchical structures, wherein smaller crystals covered large crystals.

The fatty acid coatings, and especially long fatty acid coatings, demonstrated superhydrophobic behavior resulting in high water CA and low CAH values (data not shown).

Due to limited application and scalability issues, the spray coating technique was tested as a highly versatile alternative deposition method that may also facilitate the application process.

Example 2

Sprayable Fatty Acid Solutions

Coating solutions were prepared using various saturated and unsaturated fatty acids in different organic solvents, at different concentrations. Different solvents and various fatty acid concentrations and compositions can be used, depending on the final product requirements. For example, various microorganisms may be affected differently by different fatty acids, therefore the coating composition may be chosen according to common microorganisms in the applied area.

Exemplary solvents include methanol (MeOH); ethanol (EtOH); Acetone; Diethyl ether; Ethyl acetate and Pentane.

Exemplary saturated fatty acids include: Lauric acid; Myristic acid; Palmitic acid; Stearic acid; Arachidic acid; Behenic acid; Lignoceric acid; and Cerotic acid.

Exemplary unsaturated fatty acids include: Alpha-linoleic acid; Stearidonic acid; Eicosapentaenoic acid; Cervonic acid; Linoleic acid; Linolelaidic acid; γ-Linolenic acid; Dihomo-γ-linolenic acid; Arachidonic acid; Docosatetraenoic acid; Palmitoleic acid; Vaccenic acid; Paullinic acid; Oleic acid; Elaidic acid; Gondoic acid; Erucic acid; Nervonic acid and Mead acid.

Solutions are prepared by mixing a selected fatty acid or a mixture of two or more fatty acids with a selected organic solvent, and optionally mixed also with a coloring agent (e.g., edible coloring agent).

Exemplary solutions are described in Table 1 below.

Example 3

Characterization of Sprayable Fatty Acid Solutions

Spray coating was performed by spraying a selected organic solution of a selected fatty acid or a selected mixture of fatty acids on a desired surface using commercially available spraying gun. Gun adjustment is required to obtain the optimal coating properties. Exemplary adjustment parameters included distance from the treated surface, which was optimal at around 30 cm, and pulse duration, which was optimal at 1-5 seconds (e.g., 1-2 seconds). Other parameters are described hereinabove.

Exemplary solutions were sprayed onto a surface of stainless steel, at room temperature. Roughness (RMS) and wettability measurements were performed as described hereinabove.

Table 1 hereinbelow summarizes the characterizations of exemplary fatty acids, solvents and concentrations of fatty acid-containing compositions following deposition onto a stainless steel surface at room temperature.

TABLE 1

| Fatty acid | Solvent | Concentration [mg/ml] | Roughness [μm] (about 10% RSD) | Contact angle [°] (about 5% RSD) |
|---|---|---|---|---|
| Lauric acid | EtOH | 10 | 5.2 | 113 |
| Myristic acid | EtOH | 10 | 4.7 | 115 |
| Myristic acid | Acetone | 10 | 4.2 | 120 |
| Myristic acid | Diethyl ether | 20 | 5.6 | 132 |
| Palmitic acid | EtOH | 10 | 2.3 | 111 |
| Palmitic acid | Acetone | 15 | 5.0 | 140 |
| Palmitic acid | Diethyl ether | 20 | 4.8 | 148 |
| Palmitic acid | Diethyl ether | 10 | 3.2 | 145 |
| Palmitic acid | MeOH | 10 | 3.6 | 137 |
| Stearic acid | EtOH | 20 | 1.1 | 118 |
| Stearic acid | EtOH | 5 | 0.7 | 110 |
| Stearic acid | Acetone | 20 | 7.5 | 156 |
| Stearic acid | Acetone | 5 | 1.3 | 145 |
| Stearic acid | Diethyl ether | 20 | 6.1 | 165 |
| Stearic acid | Diethyl ether | 15 | 5.7 | 149 |
| Stearic acid | MeOH | 4 | 3.5 | 136 |
| Arachidic acid | EtOH | 1 | 0.9 | 119 |
| Arachidic acid | Acetone | 2 | 2.7 | 134 |
| Arachidic acid | Diethyl ether | 10 | 4.3 | 152 |
| Behenic acid | Diethyl ether | 2 | 4.2 | 156 |

A coating composed of stearic acid (saturated fatty acid; SFA) with addition of linoleic acid (polyunsaturated fatty acid) was successfully applied onto various substrates such as glass and fabrics. For example, a mixture of 10% by weight of linoleic acid relatively to stearic acid in 50 mg/ml diethyl ether-based solution was prepared. The deposited layer featured an appearance similar to that of the layer formed of stearic acid alone. Contact angles of the coatings obtained from the mixture of these fatty acids reached 150-160° and the RMS roughness was about 15 microns (data not shown).

Table 2 below presents additional characterization of depositing by spray coating solutions containing stearic acid in ethanol, acetone or diethyl ether, and palmitic acid in diethyl ether.

As can be seen, for stearic acid, the best performance was obtained using diethyl ether solvent, with high CA and low CAH. When EtOH was used as a solvent, the coating exhibited a relatively poor performance.

Without being bound by any particular theory, it is assumed that the coating's properties are affected by the volatility of the solvent, such that more volatile solvents, featuring lower boiling temperature, provide a higher contact angle of the coated surface. If a solvent rapidly evaporates, the fatty acid crystallizes faster and thereby forms high amount of small crystals, which is reflected by hierarchical organization and improved the wetting properties of the coatings (e.g., high roughness is measured). This provides optimal surface topography which facilitates water repellence.

When palmitic acid was applied using diethyl ether solvent, CA=156.6° and CAH=11.1° were obtained by the coating. These parameters are lower relatively to those of diethyl ether-based stearic acid coating. This may be explained by the shorter aliphatic chain of palmitic acid which results in lower hydrophobicity of this molecule.

exhibit significant increase in water contact angle with values close to 160-170°, compared to those of uncoated surface.

FIGS. 1B-C exemplify the evolution in the droplet's shape toward a more spherical shape on spray-coated metal (FIG. 1B) and wood (FIG. 1C) surfaces, further indicating a clear increase in water contact angle after coating.

XRD data obtained for exemplary solutions presented in Table 1, compared to respective powders of the tested fatty acids, are presented in FIGS. 3A and 3B.

As shown therein, diffraction patterns reveal the presence of crystallographic preferred orientation in the spray-coated films relatively to that of randomly oriented powdered fatty acids. In the case of palmitic acid (FIG. 3A), diffraction peak (311) is the most intense in the powder sample, however its intensity significantly decreases in the case of diethyl ether-based spray coating. The intensity of the (602) diffraction peak has drastically decreased as well when palmitic acid was deposited by spray coating. Preferred orientation along {100} direction can be clearly recognized in the diffraction pattern of spray-coated palmitic acid.

TABLE 2

| Fatty acid | Solvent ($T_b$ [°]) | Concentration [mg/ml] | Roughness [μm] (N = 3) | Contact angle [°] (N = 3) | CAH [°] (N = 3) |
|---|---|---|---|---|---|
| Stearic acid | EtOH (78.4) | 10 | 1.5 ± 0.06 | 113.2 ± 4.6 | 27.5 ± 7.0 |
| | EtOH (78.4) | 20 | 1.1 ± 0.1 (N = 5) | 118.3 ± 5.8 (N = 5) | 11 ± 1.2 |
| | Acetone (56.0) | 10 | 11.9 ± 3.7 | 156.4 ± 1.5 | 2.3 ± 1.2 |
| | Acetone (56.0) | 20 | 7.5 ± 0.9 (N = 5) | 156.5 ± 5.5 (N = 5) | 2.0 ± 1.7 |
| | Diethyl ether (36.4) | 20 | 6.1 ± 1.0 (N = 5) | 165.3 ± 1.1 (N = 5) | 2.2 ± 1.1 |
| | Diethyl ether (36.4) | 50 | 8.0 ± 0.6 | 165.7 ± 4.4 | 1.7 ± 1.4 |
| Palmitic acid | Diethyl ether (36.4) | 50 | 4.4 ± 0.4 | 156.6 ± 2.3 | 11.1 ± 4.6 |

Fatty acids spray can be directly applied onto a wide range of substrates, including glass, steel, wood, plastic, fabric, ceramics, paints, concrete, etc. (see, FIG. 1A). As can be seen from the values of water contact angle measured before and after coating, the coated surfaces exhibit significant increase in contact angle with values close to 160-170° than those of uncoated surface. Evolution in the droplet's shape toward a more spherical shape on spray coated metal (FIG. 1B) and wood (FIG. 1C) surfaces, shown here as examples, indicates a clear increase in water contact angle after coating The applicability of the fatty acid-containing sprayable solutions for providing a coating of a wide range of substrates, including glass, steel, wood, plastic, fabric, ceramics, paints, concrete, etc., is demonstrated in FIGS. 1A-C. Stearic acid-containing solutions (0.02 gram/ml in diethyl ether) were applied to glass, fabric, paper, metal, wood, concrete, ceramic, paint and plastic. To visually demonstrate the improved non-wetting properties of the coated surfaces as compared to those of non-coated surfaces, a 7 μL methyl orange water droplet was applied to both coated and non-coated parts of each type of substrate. The obtained images are presented in FIG. 1A. Coated parts of the substrates are shown in white in FIG. 1A, and values of the measured contact angle before and after coating are given in blue and red color, respectively.

As can be seen from the values of water contact angle measured before and after coating, the coated surfaces FIG. 3B shows the diffractions collected from spray coatings of stearic acid based on different solvents. It can be seen that in the case of EtOH- and acetone-based coatings the (602) and (311) diffraction peaks exhibit reduced intensity relatively to that of powdered sample, while (300) reflections are the dominant (the planes of preferred orientation).

Unexpected diffraction peaks, left-shifted relatively to (300) and (500) planes, were observed in acetone- and diethyl ether-based stearic acid coating diffractions (FIG. 3B, blue and green plots), as well as in diethyl ether-based palmitic acid coating diffractions (FIG. 3A). Since the solvents are volatile and evaporate extremely fast when sprayed, new diffraction peaks may appear due to change in d-spacings caused by residual strains in the crystal lattice.

This indication was supported by HR-SEM (see, FIGS. 7A-D, 7G and 7H), calculations and DSC analyses (data not shown). In order to facilitate relaxation of strains, the coated glass surfaces were heated for 24 hours at 50° C. and re-characterized by XRD (7G and 7H, red plots). The heating resulted in the disappearance of the unexpected peaks, further supporting the presence of strain in the SFA coatings.

Without being bound by any particular theory, it is possible that the strain further improves the superhydrophobic behavior of the coating as it generates hierarchical surface structures and increases roughness values.

Morphology of the coatings was evaluated by high resolution scanning electron microscopy (Zeiss Ultra Plus HR-SEM).

The obtained micrographs are presented in FIGS. 4A-H, and show the topography of the fatty acids coated surfaces obtained using different solvents (10 mg/ml in EtOH or acetone; 50 mg/ml in diethyl ether).

As can be seen, spray-deposited fatty acid-coated surfaces display rough topography with several levels of hierarchy and high amount of air pockets. Such surface topography is known to provide superhydrophobicity.

In further experiments, various commercially available food coloring agents that are miscible with oily phases were added to stearic acid-containing solutions (0.02 gram/ml in diethyl ether), and the obtained solutions were spray-coated on a glass substrate. FIG. 2 presents exemplary photographs of glass substrates coated with the tested solutions. It was shown that the addition of a coloring agent to the solution does not affect the superhydrophobic and self-cleaning properties of the coating (no change in water contact angle). The obtained data indicate that compared to the corresponding thermally-deposited coatings (see, Example 1), spray-coated surfaces are more heterogeneous and provide prominent hierarchical morphology, which improves the superhydrophobic properties of the spray coatings; for example, the spray-coated palmitic acid exhibited a CA angle above 150°, while its thermally deposited counterpart demonstrated a CA below 140° (see, FIG. 8A and Table 1).

Altogether, spray coating was found to be a suitable method for applying fatty acids onto surfaces to generate superhydrophobic coatings.

Example 4

Anti-Microbial Activity

It was previously demonstrated that self-assembled superhydrophobic wax coatings exhibit anti-biofouling properties are being achieved via passive inhibition of bacterial adhesion to the surface [Pechook et al. J. Mater. Chem. B (2015), 3(7):1371-1378; and Ostrov et al. ACS Appl. Bio Mater. (2019)]. The anti-biofouling and potential antimicrobial properties of the SFA coatings, formed via spraying, were characterized using two common model bacteria, *E. coli* and *L. innocua*. The latter is a Gram-positive model bacterium and *E. coli* is a Gram-negative model bacterium.

Glass slides were spray-coated and put into 6-well plates. Palmitic acid-containing, stearic acid-containing, and arachidic acid-containing coatings (0.02 gram/ml in diethyl ether) were tested. 4 mL of diluted bacteria suspension was put into each well and incubated without shaking at 37° C. for 48±2 hours. The surfaces were removed from the suspensions, dyeing of bacteria on the surface was performed using LIVE/DEAD® BacLight™ bacterial viability kit, and HR-SEM was used as a complementary tool to qualitatively assess bacteria adhesion to the coatings (see, Materials and Experimental Methods section). Cells with damaged membrane (dead bacteria) are presented in red and cells with intact membrane (live bacteria) are presented in green.

As can be seen in FIGS. 6A-H, all spray-coated samples showed significantly lower adhered bacterial population when compared to uncoated samples.

The adhesion of *L. innocua* on fatty acid-containing coatings is reduced relative to the control uncoated substrate, as dead bacteria population prevails relative to live bacteria (see, FIG. 6E in comparison with FIGS. 6F-H). The incubation of *E. coli* generally provided similar observations, which were further supported by calculation (see, FIG. 6A in comparison with FIGS. 6B-D).

Similar observations were made by HR-SEM, as the uncoated samples are densely covered with bacteria cells, while the SFA coated surfaces show significantly lower cells density that may be attributed to the anti-fouling effect (see, FIGS. 6I-P).

While adhered *L. innocua* cells on uncoated glass retain their characteristic morphology and appear to be intact, on the fatty acid coated surfaces the cells morphology indicates damaged cells (see, FIG. 6M in comparison with FIGS. 6N-P).

*E. coli* also exhibited morphological defects on the SFA surfaces (see, FIG. 6I). The morphological changes in *E. coli* cells on SFA coated samples are more pronounced (see, FIGS. 6J-L, white arrows) than those observed on the control uncoated sample (FIG. 6I). Combining the HR-SEM and CLSM data, *E. coli* viability was decreased on the coated substrates.

To conclude, the anti-biofouling and anti-microbial activity of the spray-deposited fatty acid-containing coatings was characterized against the model bacteria, *E. coli* and *L. innocua*. The total number of live cells decreased significantly (by an order of magnitude) in all of the fatty acid spray-coated surfaces.

Example 5

Intrinsic Anti-Microbial Effect of Fatty Acids

To study the intrinsic bactericidal effect of the tested SFAs against both Gram-positive and Gram-negative bacteria, incubation of bacteria culture with powdered SFAs followed by colony counting was performed. Table 3 hereinbelow presents *E. coli* and *L. innocua* count in colony-forming unit (CFU) per milliliter, estimated by the drop-plate method following incubation for 24 hours at 37° C. with the SFA powders in respective liquid media.

TABLE 3

| Sample | *E. coli* [CFU $mL^{-1}$] | *L. innocua* [CFU $mL^{-1}$] |
|---|---|---|
| Control | $1.2 \pm 0.2 \cdot 10^8$ | $2.4 \pm 0.2 \cdot 10^5$ |
| Palmitic acid (16 C.) | $1.4 \pm 0.6 \cdot 10^8$ | $1.7 \pm 0.5 \cdot 10^4$ |
| Stearic acid (18 C.) | $1.8 \pm 0.05 \cdot 10^8$ | $1.9 \pm 0.5 \cdot 10^4$ |
| Arachidic acid (20 C.) | $9.6 \pm 3.2 \cdot 10^7$ | 0 |

As can be seen in Table 3, the tested SFAs have no inhibiting effect on Gram-negative *E. coli* growth, as the same order of magnitude of CFU per milliliter was obtained when control SFAs-incubated samples were cultured. Therefore, it can be concluded that the surface morphology has the main contribution to the anti-microbial effect of the sprayed SFAs coatings against *E. coli.*

Without being bound to any theory, it is possible that the morphological changes of *E. coli* adhered to SFA coatings are less prominent relative to those of *L. innocua* (see, FIGS. 6I-L), and are caused by a lack of intrinsic inhibitory effect of the SFAs against *E. coli*. It is also possible that the passive anti-biofouling effect of these surfaces against *E. coli*, as well as possible bactericidal effect resulting from surface hierarchical structure, promote cell rupture by physical damage such as stretching or puncturing (see, FIGS. 6A-D, FIGS. 6I-L, and Table 3).

The same SFAs possess a certain growth inhibition effect on *L. innocua*. Cell growth was inhibited by an order of magnitude when incubated with powdered palmitic acid or stearic acid (see, Table 3). Powdered arachidic acid completely inhibited *L. innocua* growth. This bacterial growth inhibition effect is likely to contribute to the CLSM and HR-SEM analyses (FIGS. 6A-P).

These data demonstrate the effect of SFAs powders on bacterial growth and corroborate the observations that adhesion of *L. innocua* to superhydrophobic SFA surfaces was not reduced merely due to passive anti-biofouling effect, and further show that *L. innocua* viability was decreased due to a bactericidal effect intrinsic to the specific SFAs (see, FIGS. 6E-H, FIGS. 6M-P, and Table 3).

Without being bound to any particular theory, it is assumed that when the fatty acid is crystallized into micron-size crystals during deposition, the chemical effect may be decreased due to lower availability of the SFA relatively to powdered SFA.

Altogether, fatty acid spray-deposited surfaces effectively prevent *E. coli* and *L. innocua* bacteria adhesion, and additionally exhibit minor bactericidal effect against *E. coli* and a significant bactericidal effect against *L. innocua*.

Example 6

The Effect of Fatty Acids on Agricultural Plants

The fatty acid sprays were tested for their agricultural application in protecting plants against microbes. Initially, the effect of the sprayed SFAs on essential biological processes in plants was tested. Live tomato plants were used as a model plant.

Tomato plants were spray-coated with palmitic acid-containing, stearic acid-containing, and arachidic acid-containing compositions (20 mg/ml in diethyl ether solution), were transferred to a greenhouse, and were monitored over time. The results are presented in FIGS. 8A-C.

Generally, no negative impact on the plants survival was observed following spraying the tomato plants with SFAs. As can be observed by comparing FIGS. 8A and 8B, no damage could be observed on the leaves of SFA coated plants, as well as on uncoated plants, 11 days after coating; all plants grew, and looked green and healthy. 24 days following SFA coating (FIG. 8C), palmitic- and stearic-acid coated plants remained green, while some brownish leaves were observed in uncoated and in arachidic acid spray-coated plants.

Overall, this assay has indicated that the fatty acid coatings have minor to favorable effect on agricultural plants.

Example 7

Ex-Planta Experiments on Flower Petals

Fatty acid coatings on agricultural plants were further examined, focusing on anti-fungal effects.

In order to test the anti-fungal effect of the coatings on agricultural plants, Ex-planta experiments on rose petals were performed.

Initially, the coating of rose petals with fatty acids was analyzed by SEM and by optical microscope, as can be seen in FIGS. 9A and 9B, respectively.

As can be seen in the SEM images (FIG. 9A), fatty acid clusters are primarily attached to the top of the papilla cells of the rose petals. Moreover, as observed by optical microscope (see, FIG. 9B), palmitic acid-containing coatings were uneven on the complex rose petal surface, leading to sprayed layer which differ in coverage area and size of fatty acid clusters. Optical microscope images of deposited stearic acid-containing and arachidic acid-containing compositions are similar to that of palmitic acid-containing composition. The discontinuous layer decreases the risk of negative effect of the spray on plants biological processes.

The fatty acid-containing compositions slightly increase the water contact angle of the rose petals (data not shown).

Next, *Botrytis Cinerea*, a common fungus that affects many plants, including wine grapes and strawberries, was chosen as a model fungus.

*Botrytis cinerea* culture was diluted in potato dextrose broth (PDB) medium to a final concentration of $10^4$ spores per milliliter. 30 μL droplets were put on the coated leaves and uncoated control leaves and left in room temperature protected from light for 72 hours. Then, photographs of the petals were taken and are presented in FIG. 10A. A damaged area can be observed below and surrounding each droplet.

The damaged area was then measured using a caliper along its long and the short directions. The damaged surface area was calculated assuming an ellipse shape, as demonstrated in FIG. 10B.

The data, presented in FIG. 10C, indicate that all coatings provided protection against *Botrytis cinerea*. A thick palmitic acid-containing coating most effectively inhibit damage propagation caused by *Botrytis cinerea* spores.

A rose petal affected by *Botrytis cinerea* was further analyzed by SEM and the images are presented in FIGS. 11A-C. The closer the infected area, the more deformed papilla cells are observed.

Next, the anti-fungal activity of fatty acids was tested in order to elucidate the activity of the coatings.

Example 8

Anti-Fungal Effect of Neat Fatty Acids

In order to examine the anti-fungal effects of fatty acids, powder fatty acids were tested using *Botrytis cinerea* as a model fungus.

*Botrytis cinerea* spores were plated on potato dextrose agar (PDA) plates, each fatty acid powder was placed in the center of the plate, and the plates were then incubated at 24° C. for 72 hours. In the case of caprylic acid, a hole was punched in the middle of the agar plate in order to contain its liquid form. FIGS. 12A-E present the intrinsic anti-fungal effect of the tested fatty acids against *Botrytis cinerea* growth.

While palmitic acid and behenic acid powders (FIGS. 12B and 12C, respectively) do not present any anti-fungal effect against *Botrytis cinerea* compared to the control (FIG. 12A), sorbic acid powder presents significant growth inhibition (FIG. 12D), and complete inhibition of *Botrytis cinerea* growth was obtained by liquid caprylic acid (FIG. 12E). Although demonstrating intrinsic anti-fungal properties, sorbic and caprylic acids cannot be used as single components in spray coatings; caprylic acid is liquid at room temperature, and sprayed sorbic acid coating showed poor properties in preliminary tests (data not shown) as a hydrophilic coating which was not stable over time.

Therefore, it was hypothesized that a combinations of sorbic and/or caprylic acids with longer saturated fatty acids (e.g., palmitic acid) may result in stable superhydrophobic coatings with additional anti-microbial activity.

In order to examine the effect of combined (multicomponent) fatty acid coatings on anti-fungal activity, glass slides were spray-coated fatty acid-containing diethyl ether solutions (20 mg/ml) and placed into 12-well plates. Palmitic acid-containing, combined palmitic acid and sorbic acid-containing, and behenic acid-containing coatings were tested. A 20 μL droplet of concentrated *Botrytis cinerea* spores suspension (105 spores per mL) was dropped on the surface and incubated inside a 12-well plate for an hour at room temperature. Then, 2 ml of PDB medium was added to each well and the samples were incubated for additional 72 hours at 24° C.

*Botrytis cinerea* was developed in the liquid phase in all the wells except from those of the combined palmitic and sorbic acid coating (FIG. 13). The combined palmitic and sorbic acids coating possess anti-fungal activities when placed in direct contact with *Botrytis cinerea* spores solution.

These data indicate that anti-microbial activities can be obtained from multi-component spray coatings, which include passive (non-antimicrobial) fatty acid that provides a hydrophobic coating as a matrix and an active (antimicrobial) fatty acid as an additive.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A process of depositing a hydrophobic or superhydrophobic layer on at least a portion of a surface of a substrate, the process comprising spraying onto said at least a portion of said surface a solution comprising a free fatty acid and an organic solvent, thereby depositing a hydrophobic or superhydrophobic film on said at least a portion of said surface, wherein said fatty acid is a saturated fatty acid of at least 12 carbon atoms in length, wherein said organic solvent has an evaporation rate higher than 3 relative to n-butyl acetate, wherein said hydrophobic or superhydrophobic layer is edible, and wherein said at least a portion of said surface that has said layer deposited thereon features:

a static contact angle with water of at least 90°; and/or roughness of at least 0.2 micrometer(s); and/or a porosity that ranges from 10 to 85% by volume.

2. The process of claim 1, wherein said organic solvent has a boiling temperature lower than 70° C.; and/or has an evaporation rate higher than 5 relative to n-butyl acetate.

3. The process of claim 1, wherein said free fatty acid is at least 18 carbon atoms in length, said organic solvent has an evaporation rate higher than 5 relative to n-butyl acetate, and a concentration of said free fatty acid in said solution ranges from 5 to 50 mg/ml.

4. The process of claim 1, wherein said solution further comprises an anti-microbial agent.

5. The process of claim 4, wherein said anti-microbial agent is an additional fatty acid.

6. The process of claim 5, wherein said additional fatty acid is of no more than 12 carbon atoms in length and/or is liquid at room temperature.

7. The process of claim 1, wherein said solution further comprises a coloring agent.

8. The process of claim 7, wherein said coloring agent is an edible coloring agent.

9. The process of claim 1, wherein said spraying is performed at room temperature.

10. The process of claim 1, further comprising, subsequent to said spraying, heating the substrate.

11. The process of claim 1, wherein said substrate comprises a natural organic material selected from a food product and an agricultural substance, or forms a part of an edible substance or a food contact substance or an agricultural substrate or substance.

12. A substrate having deposited on at least a portion of a surface thereof a hydrophobic or superhydrophobic layer, prepared by the process of claim 1.

* * * * *